United States Patent
Kamath et al.

(10) Patent No.: US 12,462,205 B2
(45) Date of Patent: *Nov. 4, 2025

(54) DYNAMIC MEMORYLESS DEMAND-SUPPLY PEGGING

(71) Applicant: o9 Solutions, Inc., Dallas, TX (US)

(72) Inventors: Narasimha Kamath, Bangalore (IN); Kshitiz Uttam, Bangalore (IN)

(73) Assignee: o9 Solutions, Inc., Dallas, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/119,660

(22) Filed: Mar. 9, 2023

(65) Prior Publication Data

US 2023/0325741 A1 Oct. 12, 2023

Related U.S. Application Data

(63) Continuation of application No. 15/783,660, filed on Oct. 13, 2017, now Pat. No. 11,615,357.

(51) Int. Cl.
G06Q 10/0631 (2023.01)
G06Q 10/087 (2023.01)

(52) U.S. Cl.
CPC ..... *G06Q 10/06315* (2013.01); *G06Q 10/087* (2013.01)

(58) Field of Classification Search
CPC .................. G06Q 10/087; G06Q 10/06315
See application file for complete search history.

(56) References Cited

U.S. PATENT DOCUMENTS

| 7,248,937 | B1 | 7/2007 | Brown et al. |
| 8,170,899 | B2 | 5/2012 | Chorley et al. |
| 8,311,905 | B1* | 11/2012 | Campbell ............. G06Q 10/06 235/382 |
| 8,326,670 | B2 | 12/2012 | Wittrock |
| 8,958,899 | B2 | 2/2015 | Han |
| 2002/0188499 | A1 | 12/2002 | Jenkins et al. |
| 2003/0065415 | A1 | 4/2003 | Hegde et al. |
| 2006/0250248 | A1 | 11/2006 | Tu et al. |

(Continued)

OTHER PUBLICATIONS

"U.S. Appl. No. 15/783,660, Final Office Action mailed May 20, 2020", 26 pgs.

(Continued)

*Primary Examiner* — Deirdre D Hatcher
(74) *Attorney, Agent, or Firm* — Schwegman Lundberg & Woessner, P.A.

(57) ABSTRACT

Systems and techniques for dynamic memoryless demand-supply pegging are described herein. An identification may be received of a demand to be pegged. An inventory may be determined for a material node at a time bucket. A set of other demands may be identified for the material node at the time bucket. A quantity to be pegged may be calculated. A quantity to skip may be calculated based on a sum of demand units corresponding to members of the set of other demands having a lower priority than the demand. A supply set of units may be identified. A pegged subset of the supply set of units may be generated by skipping members of the supply units equal to the quantity to skip. A graphical representation of the supply set of units for the time bucket may be output including identification of members of the pegged subset.

20 Claims, 13 Drawing Sheets

(56) References Cited

U.S. PATENT DOCUMENTS

| | | |
|---|---|---|
| 2007/0073886 A1 | 3/2007 | Fornichev |
| 2009/0240544 A1 | 9/2009 | Cheng et al. |
| 2009/0307026 A1* | 12/2009 | Ervolina .............. G06Q 10/087 705/7.31 |
| 2011/0270646 A1 | 11/2011 | Prasanna et al. |
| 2012/0054076 A1 | 3/2012 | Wu et al. |
| 2013/0103456 A1 | 4/2013 | Bannister et al. |
| 2017/0323241 A1 | 11/2017 | Gauba et al. |
| 2019/0114567 A1 | 4/2019 | Kamath et al. |

OTHER PUBLICATIONS

"U.S. Appl. No. 15/783,660, Final Office Action mailed Aug. 17, 2022", 30 pgs.

"U.S. Appl. No. 15/783,660, Final Office Action mailed Dec. 7, 2021", 30 pgs.

"U.S. Appl. No. 15/783,660, Non Final Office Action mailed Apr. 28, 2021", 25 pgs.

"U.S. Appl. No. 15/783,660, Non Final Office Action mailed Apr. 28, 2022", 27 pgs.

"U.S. Appl. No. 15/783,660, Non Final Office Action mailed Sep. 16, 2019", 17 pgs.

"U.S. Appl. No. 15/783,660, Notice of Allowance mailed Dec. 1, 2022", 5 pgs.

"U.S. Appl. No. 15/783,660, Response filed Feb. 18, 2020 to Non Final Office Action mailed Sep. 16, 2019", 13 pgs.

"U.S. Appl. No. 15/783,660, Response filed Apr. 7, 2022 to Final Office Action mailed Dec. 7, 2021", 17 pgs.

"U.S. Appl. No. 15/783,660, Response filed Jul. 28, 2022 to Non Final Office Action mailed Apr. 28, 2022", 17 pgs.

"U.S. Appl. No. 15/783,660, Response filed Aug. 30, 2021 to Non Final Office Action mailed Apr. 28, 2021", 17 pgs.

"U.S. Appl. No. 15/783,660, Response filed Sep. 21, 2020 to Final Office Action mailed May 20, 2020", 12 pgs.

"U.S. Appl. No. 15/783,660, Response filed Nov. 17, 2022 to Final Office Action mailed Aug. 17, 202", 15 pgs.

* cited by examiner

DYNAMIC MEMORYLESS DEMAND-SUPPLY PEGGING

CLAIM OF PRIORITY

This application is a continuation of U.S. patent application Ser. No. 15/783,660, filed Oct. 13, 2017, which is incorporated by reference herein in its entirety.

TECHNICAL FIELD

Embodiments described herein generally relate to automated manufacturing workflows and, in some embodiments, more specifically to dynamic and memoryless demand and supply pegging.

BACKGROUND

A production supply chain may include demands for various supplies of an item through the procurement, production, and distribution process of a product. For example, components of a finished assembly may demand a supplies of various items contained in a bill of materials for the sub-assembly. As the sub-assembly may be used in generation of the finished assembly, a demand for an item used in the sub-assembly may be assigned to the finished assembly. It may be helpful to calculate dependent demands along the supply chain for resource planning purposes. The demands may be pegged to supplies (e.g., assigning supply to demands along the supply chain, etc.) so that portions of a supply may be virtually earmarked for demands in the supply chain. Pegging demand to supply may be computed by traversing—upstream or downstream—a supply chain. Traditionally, first-in-first-out (FIFO) pegging may be used that may be dependent on the order and/or sequence of demands placed on demand nodes (e.g., a node defining demand along the supply chain, etc.). Traditional FIFO pegging may reduce flow plans (e.g., amount of available supply, etc.) by an amount that may be pegged on a route in a particular supply bucket. Hence it may be difficult to peg demand to a supply without pegging prior demands to the demand of interest in sequence.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Traditional heuristic supply chain planning may follow an order by order (OBO) planning approach where demands may be taken one after the other based on priority. The planning may propagate upstream while respecting the material, capacity, and network constraints. Some traditional planning techniques may follow a hard peg approach where a demand may be pegged at the same time it is planned. This may lead to plan quality deterioration. Other traditional planning techniques may peg demand as a post process (e.g., after all planning is done, etc.). Other planning techniques may use first-in-first-out (FIFO) where demand is pegged in order or sequence. Traditional planning method employing demand pegging may take demands in some order of priority and peg the demands upstream for the flows generated by each demand. However, because these traditional techniques may rely on pegging demand in order, such traditional techniques may not allow for pegging any chosen demand uniquely to a supply. If all the flow plans are provided and a user needs to get the flow plan of a random order, it may not be possible to determine a flow plan until all the previous demands are pegged.

The present techniques provide an ability to peg demands in parallel thereby improving the stability and robustness of the pegging process by providing an independent demand pegging solution that may peg demand to a supply at any point in the supply chain without pegging other demands first. Furthermore, improvements in performance may be realized as the present techniques allow for horizontal scaling of the pegging process by enabling the system to run multiple pegging threads simultaneously to calculate a variety of independent demand peggings.

A user may choose any demand along a supply chain and the present techniques may uniquely provide a corresponding supply pegging. This may aid in incremental planning and other interactive workflows and may allow for demand pegging in real-time (or near real-time). Unlike traditional techniques, the present techniques do not hold all peggings in memory and may be flushed out to disk storage based on memory allocation/availability. Thus, memory utilization may be maximized by independently calculating demand pegging. These improvement may improve the ability to processes big data/scaled datasets of large customers with complex supply chain flows.

Figure 1:
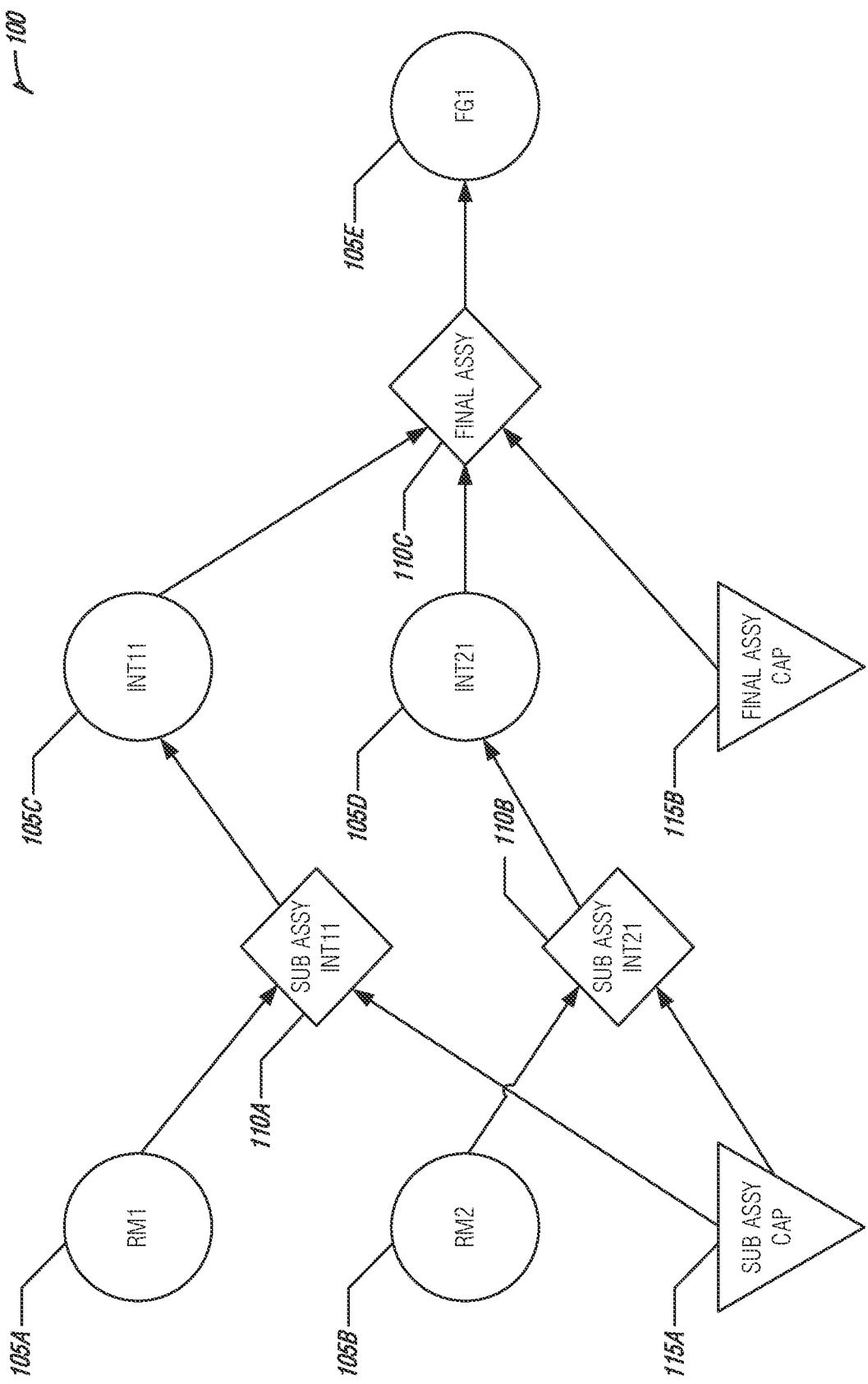
FIG. 1 illustrates an example of a supply chain in which dynamic memoryless demand-supply pegging may be used, according to an embodiment.

FIG. 1 illustrates an example of a supply chain 100 in which dynamic memoryless demand-supply pegging may be used, according to an embodiment. The supply chain 100 may include a variety of nodes such as material node 105A, 105B, 105C, 105D, and 105E, collectively referred to as the material nodes 105. Each material node 105 represents a supply buffer (e.g., a representation of resources available, a bill of materials, etc.) used along the production path of the supply chain 100. A supply buffer may be a physical or virtual representation of where supply may be held. The material nodes 105 may be connected by edges to activity node 110A, 110B, and 110C, collectively referred to as the activity nodes 110. Each activity node 110 represents a production activity that uses resources to produce an output. A production activity may be a procurement (e.g., supply from a supplier), a production (e.g., where components come together to produce a finished goods/items), a distribution (e.g., movement of a finished good from one location to another), etc. The output from the activity nodes 110 may in turn be assigned to a material node 105. The supply chain 100 may include capacity node 115A and 115B, collectively referred to as the capacity nodes 115. The capacity nodes 115 represent a capacity of output that may be generated by the activity nodes 110. Capacity may represent labor, machines, etc. which may provide a certain throughput to the supply chain process.

Materials flowing out of the material nodes 105 may be used as inputs (e.g., as defined by a bill of materials, etc.) by the activity nodes 110 to produce (e.g., assemble, etc.) an output. The outputs of the activity nodes 110 may in turn be used as inputs to material nodes 105 that may be upstream in the supply chain 100. For example, the output of the material node 105A may be used as input to the activity node 110A which may in turn output a sub-assembly to the material node 105C for use in producing a final assembly by the activity node 110C. In another example, the output of the material node 105B may be used as input to the activity node 110B which may in turn output a sub-assembly to the material node 105D for use in producing a final assembly by the activity node 110C.

Flow of material happens along the edges connecting the material nodes 105 and the activity nodes 110 and may be "bucketized" in time buckets. A time bucket is a unit of time representing a period of consumption. A time bucket may be expressed in hours, days, weeks, months, etc. The activity nodes 110 do not carry any inventory (physical or abstract) and are considered "no carry" nodes. The activity nodes may be represented as $\Sigma i_t - \Sigma o_t = 0 \forall t$ where $i_t$ is an inflow of material/supplies into the node at time bucket t and or is an outflow of material/supplies from the node at time bucket t.

However, material nodes 105 may carry physical inventory and are considered "buffer" nodes. Thus, the equation used for the activity nodes 110 may not accurately reflect material availability as the supplies held by the material nodes 105 may vary. Thus, the equation $\Sigma_0{}^j(\Sigma j_k - \Sigma 0_k) \geq 0 \forall j \epsilon (0, n)$ where n is the number of time buckets is used to represent the material nodes 105.

Demand may be pegged to one of the material nodes 105 in the supply chain 100 by mapping inflows and outflows at each level in the supply chain network. Many peggings may be possible given a supply chain, flow plans, and demands. However, traditional techniques for pegging demand may rely on ordered calculation of demand pegging along the supply chain to peg the demand of an intermediary material node such as, for example, material node 105C. The present techniques overcome this problem with traditional techniques by allowing for the independent determination of a demand pegging for any of the material nodes 110 allowing for a variety of benefits such as, for example, processing efficiency, reduced memory usage, parallel demand pegging processing, etc.

Figure 2:
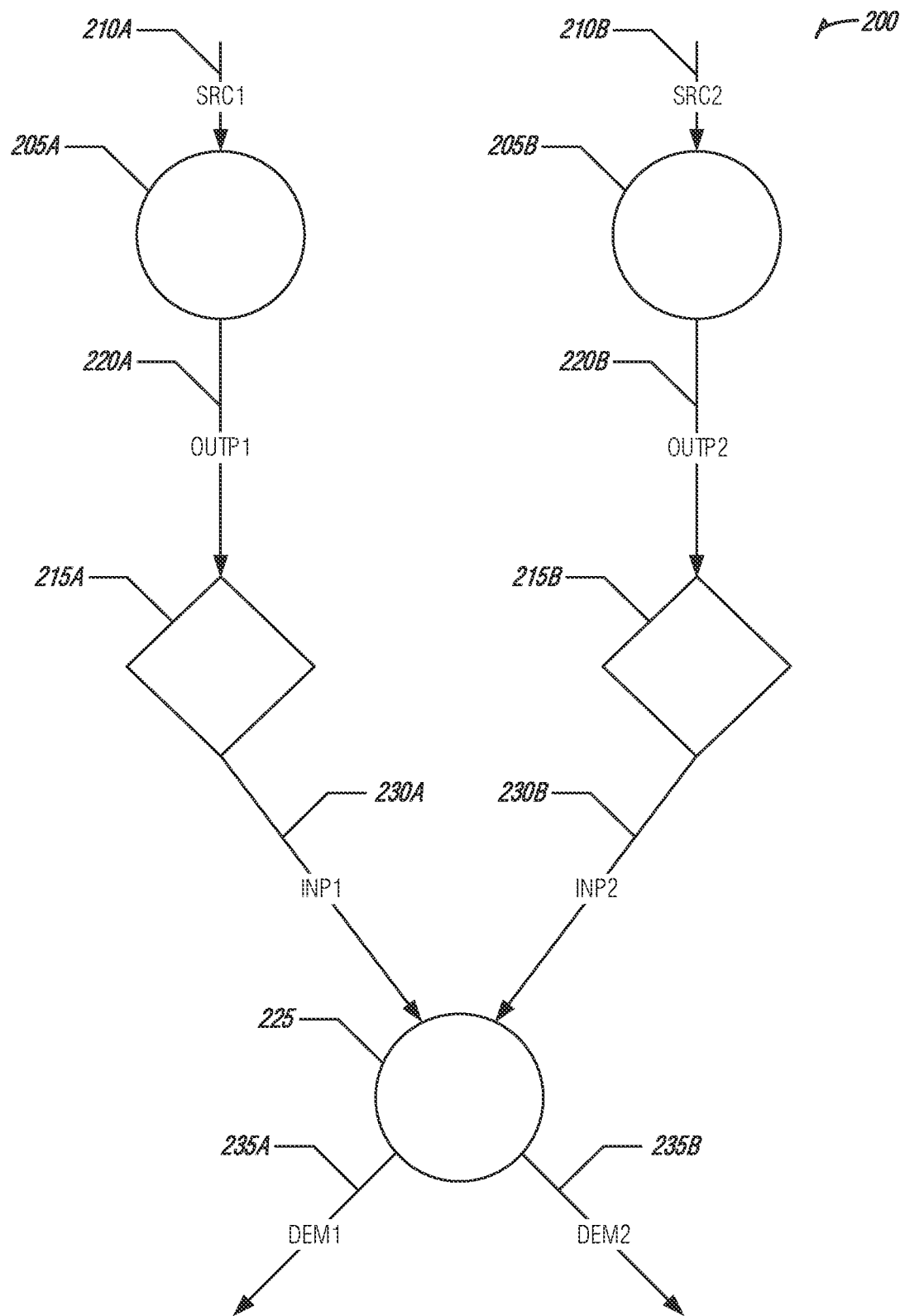
FIG. 2 illustrates an example of a flow diagram for a supply chain in which dynamic memoryless demand-supply pegging may be used, according to an embodiment.

FIG. 2 illustrates an example of a flow diagram 200 for a supply chain in which dynamic memoryless demand-supply pegging may be used, according to an embodiment. The flow diagram 200 includes two supply chain flows producing outflows to a material node 225. One flow includes an inflow 210A into a material node 205A. The material node 205A has an outflow 220A that is also an inflow of activity node 215A. The outflow 230A of the activity node 215A is also an inflow of the material node 225. A second flow includes an inflow 210B into a material node 205B. The material node 205B has an outflow 220B that is also an inflow of activity node 215B. The outflow 230B of the activity node 215B is also an inflow of the material node 225. A material node may include a variety of inflows and outflows depending on the arrangement of the supply chain. For example, material node 225 includes outflows 235A and 235B which may each be inflows to an additional activity node (not shown). The capacity, if not consumed in a time bucket may expire, where as in a material node, the inventory may be carried over to the next time bucket.

Demands may be pegged to each inflow and outflow upstream from the demand that is to be pegged. For example, to peg the demand for outflow 235A, the outflows 230A and 230B, outflows 220A and 220B, and inflows 210A and 210B may be pegged. For example, the demand at outflow 235A may be one hundred units which may be pegged to a supply of one hundred units flowing through inflow 210A, outflow 220A, and outflow 230A. In another example, the demand for one hundred units at outflow 235A may be pegged to a supply of one hundred units flowing through inflow 210B, outflow 220B, and outflow 230B. In yet another example, the demand for one hundred units at outflow 235A may be pegged to a supply of fifty units flowing through inflow 210A, outflow 220A, and outflow 230A, and fifty units flowing through inflow 210B, outflow 220B, and outflow 230B. As illustrated, virtually any combination of upstream supplies may be pegged to a downstream demand.

The present techniques provide the ability to provide a first-in-first-out pegging for a demand that is agnostic of any order in which demands may be pegged. In other words, any demand may be independently pegged to a supply without concern for other demands within the supply chain. The user may select a demand to peg (e.g., using a graphical representation of a supply chain, etc.). For example, the user may choose a demand of x units for time bucket r for material node N. Inventory for material node N may be determined for time bucket r. Other demand for the material node N may be determined during the time bucket r. The demands may be sorted. In an example, actual demands (e.g., final output demand, etc.) may be prioritized over flow plans (e.g., a demand flowing into an activity node, etc.). Actual demands may be sorted by priority. Flow plans may be sorted by order of priority of the consuming activity (e.g., priority of the activity node into which the demand flows, etc.).

A quantity to peg (q2p) value is calculated to equal the units of the demand. The q2p represents a number of units to be pegged to fulfill the selected demand. In the example, the q2p value is equal to x. A quantity to skip (q2s) value is calculated representing the inventory for the time bucket plus the sum of lower priority demand units for the time bucket. In the example, the q2s value is equal to inventory at r plus the sum of units attributable to demands having a lower priority for the time bucket r than the selected demand. Backwards from the current time bucket units equal to the value of q2s are skipped. Units in a time bucket may be sorted for pegging. For example, the units may be sorted by selecting units from beginning on hand (BOH), then expected receipts (ER), then supply from activities nodes based on activity priority.

In an example, demand pegging may be represented by the pseudocode.

```
Peg(q2p, q2s, bucket)
{
  q2s = q2s + inventory@bucket +
  lower_priority_consumptions_in_bucket;
  foreach (var prod in sorted_list_of_prodcutions) {
    if (prod <= q2s) q2s = q2s - prod;
    else {
      var q2s_for_upstream = q2s;
      var q2p_for_upstream = 0;
      if (prod < q2p + q2s) {
        q2p_for_upstream = prod - q2s;
        q2p = q2p - q2p_for_upstream;
      } else {
        q2p_for_upstream = q2p;
        q2p = 0;
      }
      var producer = prod.GetProducer( );
      var bucket = prod.GetBucket( );
      producer.Peg(q2p_for_upstream, q2s_for_upstream,
      bucket);
    }
    if (q2p == 0) break;
  }
}
```

The peggings may be displayed in a supply chain management graphical user interface. Additionally or alternatively, the peggings may be used in automatic creation of supply chain management plans which may in turn be used in the automation of supply chain management tasks. For example, the peggings for a particular material node may be used to determine an appropriate inventory level for a time period and raw materials to maintain the appropriate BOH level may be automatically ordered based on the pegging. Similarly resource pegging from element 115 as described in FIG. 1 may be used to find effective capacity that may be needed to fulfill demands.

Figure 3:
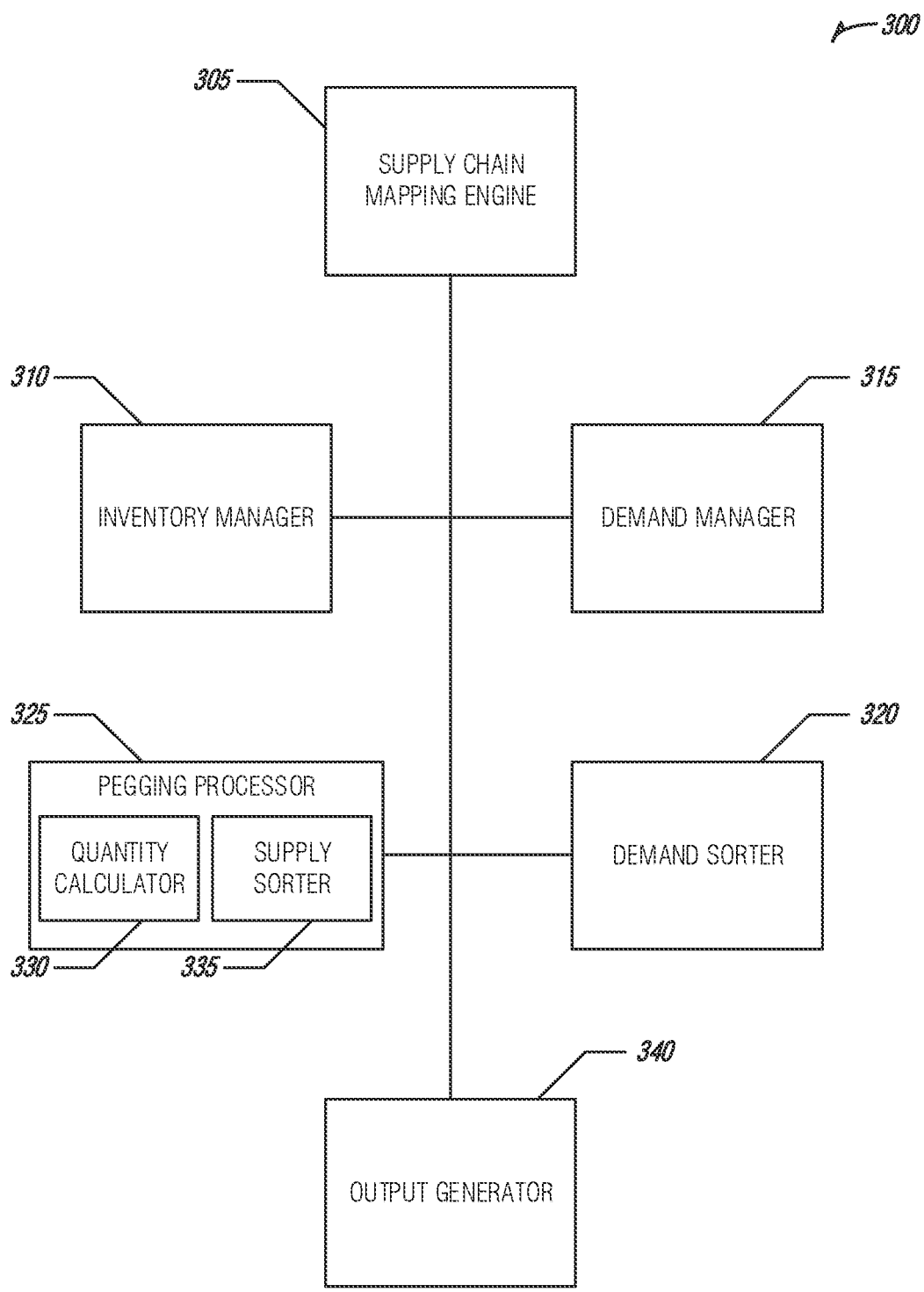
FIG. 3 illustrates an example of a system for dynamic memoryless demand-supply pegging, according to an embodiment.

FIG. 3 illustrates an example of a system 300 for dynamic memoryless demand-supply pegging, according to an embodiment. The system 300 may provide features as described in FIGS. 1 and 2. The system 300 may include a supply chain mapping engine 305, an inventory manager 310, a demand manager 315, a demand sorter 320, a pegging processor 325, and an output generator 340 communicatively coupled via a network (e.g., wireless network, cellular network, wired network, etc.). The pegging processor 325 may include a quantity calculator 330 and a supply sorter 335.

The supply chain mapping engine 305 may provide a graphical user interface for generating and mapping supply chains in a supply chain map. The supply chain map may be interactive allowing for a user to select nodes of the supply chain to obtain additional details. The supply chain mapping engine 305 may automatically generate supply chain maps and supply chain tasks based on the nodes and the arrangement of nodes in the map. The supply chain mapping engine 305 may receive an identification of a first demand to be pegged. The identification may include a material node, a unit quantity, and a time bucket for the first demand. In an example, the identification may be received via a supply chain management graphical interface. For example, the user may click, or otherwise select, a material node in a supply chain map they wish to peg.

The supply chain mapping engine 305 may generate a supply chain data structure including nodes and edges. The nodes may include material nodes (e.g., material nodes 105 as described in FIG. 1, etc.), activity nodes (e.g., activity nodes 110 as described in FIG. 1, etc.), and capacity nodes (e.g., capacity nodes 115 as described in FIG. 1, etc.). The nodes may be connected by internal links in the data structure forming edges between nodes. The edges may define relationships between nodes in the supply chain. For example, an edge may represent an outflow of a material node that is an inflow to an activity node and may represent a flow relationship between the material node and the activity node. Each node in the data structure may include a variety of data elements such as, for example, a node type, a consumption value, a production value, time buckets, etc. The data elements of the nodes may be transmitted by the supply chain mapping engine 305 to other components of the system 300.

The inventory manager 310 may determine inventory profiles of a material node in various time buckets. The inventory manager 310 may query the supply chain data structure of the supply chain mapping engine 305 to determine the inventory for the node for the selected time bucket. For example, a sub-assembly material node may have one hundred units in inventory for a time bucket of Tuesday. In the example, the inventory manager 310 may determine the inventory for the sub-assembly material node to be one hundred units using the time bucket of Tuesday.

The demand manager 315 may identify a set of other demands for the material node using the time bucket. The demand manager 315 may query the supply chain data structure of the supply chain mapping engine 305 to identify the set of other demands for the node for the selected time bucket. For example, there may be two activity nodes designating the output of the sub-assembly material node as inflows in making a final assembly. Each of the two final assembly nodes may have a consumption value of fifty units as determined from analyzing the supply chain data structure.

The demand sorter 320 may sort the identified other demands by priority. The demand sorter 320 may work in conjunction with the supply chain mapping engine 305 to assign a priority to each member of the set of other demands. The set of other demands may be consumers of a material/supplies provided by the first demand. For example, the consumption may be from a downstream activity node (e.g., a downstream demand, actual demand, etc.) or from a flow plan (e.g., an expected output, etc.).

In an example, members of the set of other demands corresponding to actual demands may be assigned a higher priority than members of the set of other demands corresponding to flow plan demands. For example, an actual demand for sub-assemblies from the sub-assembly material node may be assigned a priority of high while a flow plan demand for sub-assemblies from the sub-assembly material node may be assigned a priority of low. In an example, the members of the set of other demands corresponding to actual demands may be assigned a priority based on an actual demand priority corresponding to respective actual demands. For example, there may be two other demands corresponding to actual demands and the first other demand may be assigned a priority of one and the second other demand may be assigned a priority of two because the respective actual demand for the first other demand has a higher priority than the respective actual demand of the second other demand.

In an example, the members of the set of other demands corresponding to flow plan demands may be assigned a priority based on an activity priority corresponding to an activity node corresponding with respective of the flow plan demands. For example, there may be two other demands corresponding to flow plan demands and the first other demand may be assigned a priority of one and the second other demand may be assigned a priority of two because the respective activity node for the first other demand has a higher priority than the respective activity node of the second other demand.

The pegging processor 325 may peg demands to supplies. The pegging processor 325 may work upstream from the first demand and calculate a quantity to skip and a quantity to peg at each stage of the supply chain (e.g., each outflow, node, etc.) between the demand and the supply. For example, a demand for the sub-assembly material node may be pegged to supplies of inventory further upstream in the supply chain. The pegging processor 325 may work in conjunction with the inventory manager 310, the demand manager 315, and the demand sorter 320 to identify the inventory and demands at each stage of the supply chain.

The quantity calculator 330 may calculate a quantity to be pegged based on the unit quantity. The quantity to be pegged may represent the number of units used to fulfill a demand being pegged. For example, the sub-assembly material node may have a unit quantity of one hundred sub-assembly units as determined from the supply chain data structure of the supply chain mapping engine 305 and the quantity to be pegged may be calculated to be equal to the unit quantity. The quantity calculator 330 may calculate a quantity to skip based on a sum of demand units corresponding to members of the set of other demands having a lower priority than the first demand added to the inventory. The quantity to skip may allow supply to be preserved for the lower priority demands. For example, there may be three members of the set of other demands and two of the members may have a lower priority than the first demand. A first member may have a demand unit value of fifty units and the second member may have a demand unit value of fifty units. The demand units may be summed to equal one hundred units. In the example, the inventory for the first demand may be two hundred units. Thus, in the example, the quantity to skip may be calculated as three hundred units.

The supply sorter 335 may identify a supply set of units for the time bucket. For example, supply units may be identified from upstream material nodes and activity nodes than may hold or produce units of the material/supplies of the demand. In an example, the supply sorter 335 may prioritize the supply units using a set of prioritization rules. The prioritization rules may be specific to each production output and each supply inflow for each node and may define which sources of supply should be user or pegged first. In an example, the supply set of units may be ordered based on an inventory status identifier of each member of the supply set of units. In an example, members of the supply set of units having an inventory status identifier of beginning on hand are ordered first, members of the supply set of units having an inventory status identifier of expected receipts are ordered next, and the remaining members are ordered based on an activity priority corresponding to respective of the remaining members. For example, units of a supply from an upstream material node with a status of beginning on hand (BOH) may be assigned a priority of one, which is in first bucket while supplies in the other time buckets coming in as expected receipts (ER) may be assigned a priority of two.

The pegging processor 325 may generate a pegged subset of the supply set of units by skipping members of the supply set of units equal to the quantity to skip. The number of members in the pegged subset equal to the quantity to be pegged. For example, there may be a quantity to skip of one hundred units and a quantity to peg of fifty units. There may be fifty units of supply that have a priority of one and two hundred units of supply that have a priority of two. The quantity to skip is processed first against the calculated supply. In the example, all fifty of the priority one units are skipped as well as fifty priority two units. The quantity to peg quantity is not processed using units subsequent to those skipped. In the example, fifty units of the priority two units that are subsequent to the skipped units are pegged to the demand leaving one hundred priority two units unprocessed.

The skipped units may be pegged to lower priority demands and the unprocessed units may be pegged to higher priority demand. This technique allows each demand pegging to be computed independently. For example, the skipped units may have already been pegged to lower priority demands or may subsequently be pegged to lower priority demands. Similarly, the unprocessed units may have already been pegged to higher priority demands or may subsequently be pegged to higher priority demands. Thus, rather than processing demands sequentially, the pegging processor 325 may be used to process the demands in any order (or no order) depending on the information requested resulting in lower processing overhead and reduced memory and storage utilization.

The pegging processor 325 may continue to process nodes of the supply chain data structure until a selected demand is pegged back to a supply. Any set of demands may be pegged incrementally by recursively processing the nodes and edges between a supply and a demand. Each demand is pegged individually meaning that multiple demands may be pegged in parallel without concern for pegging calculations for other demands allowing for horizontal scalability. Big data techniques (e.g., cluster-based computing, distributed file systems, data warehousing, etc.) may be used to process many demand pegging operations simultaneously.

The output generator 340 may output a graphical representation of the supply set if units for the time bucket including identification of members of the pegged subset. In an example, the output may be generated for display in the supply chain graphical user interface. For example, a chart, graph, or other graphical representation of the supply set of units may be displayed indicating skipped units, pegged units, and unprocessed units, etc. An example of a pegging diagram in provided in FIG. 5.

Figure 13:
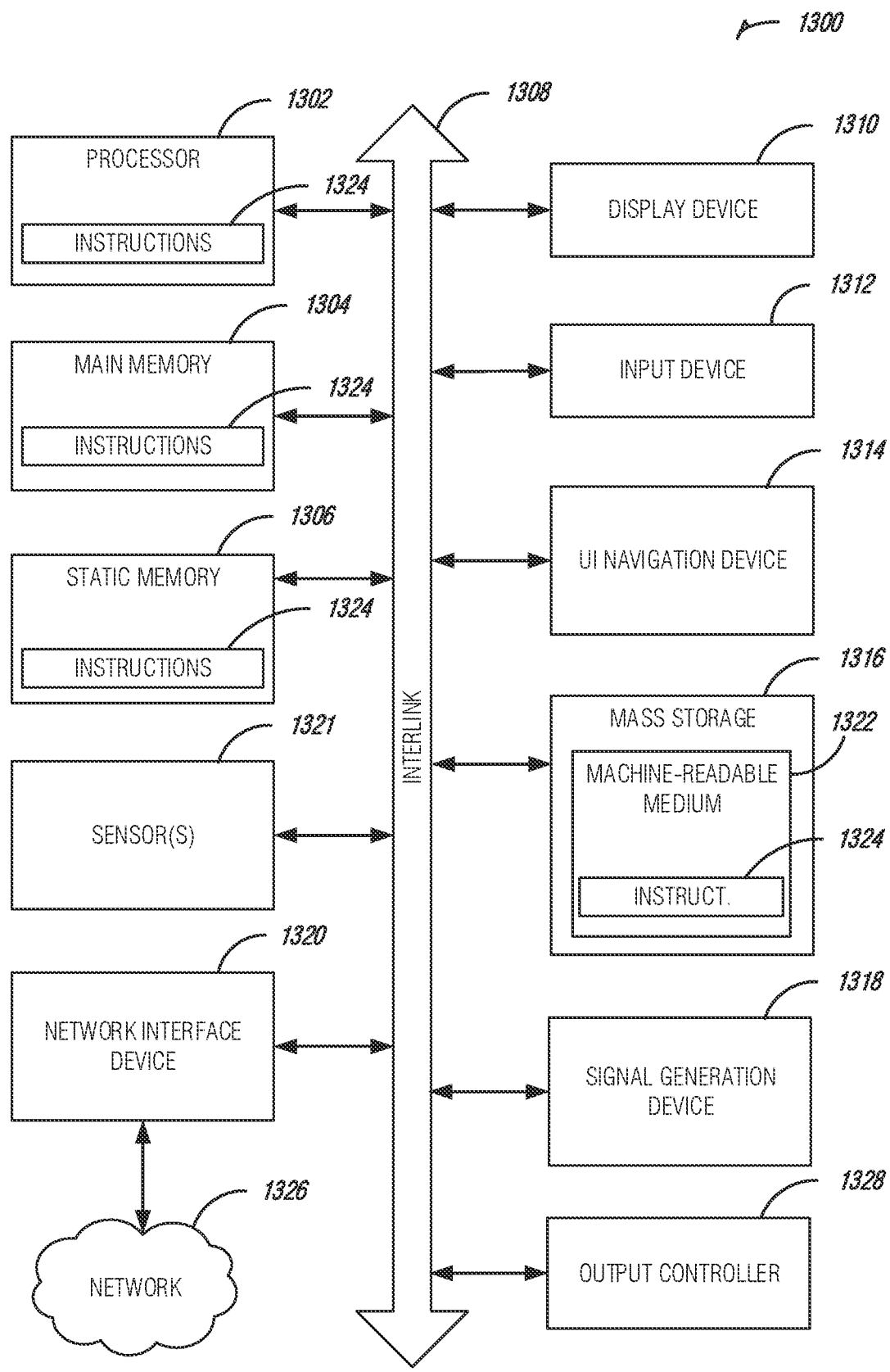
FIG. 13 is a block diagram illustrating an example of a machine upon which one or more embodiments may be implemented.

The supply chain mapping engine 305, the inventory manager 310, the demand manager 315, the demand sorter 320, the pegging processor 325, the quantity calculator 330, the supply sorter 335, and the output generator 340 may comprise one or more processors (e.g., hardware processor 1302 described in FIG. 13, etc.) that execute software instructions, such as those used to define a software or computer program, stored in a computer-readable storage medium such as a memory device (e.g., a main memory 1304 and a static memory 1306 as described in FIG. 13, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the supply chain mapping engine 305, the inventory manager 310, the demand manager 315, the demand sorter 320, the pegging processor 325, the quantity calculator 330, the supply sorter 335, and the output generator 340 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 4:
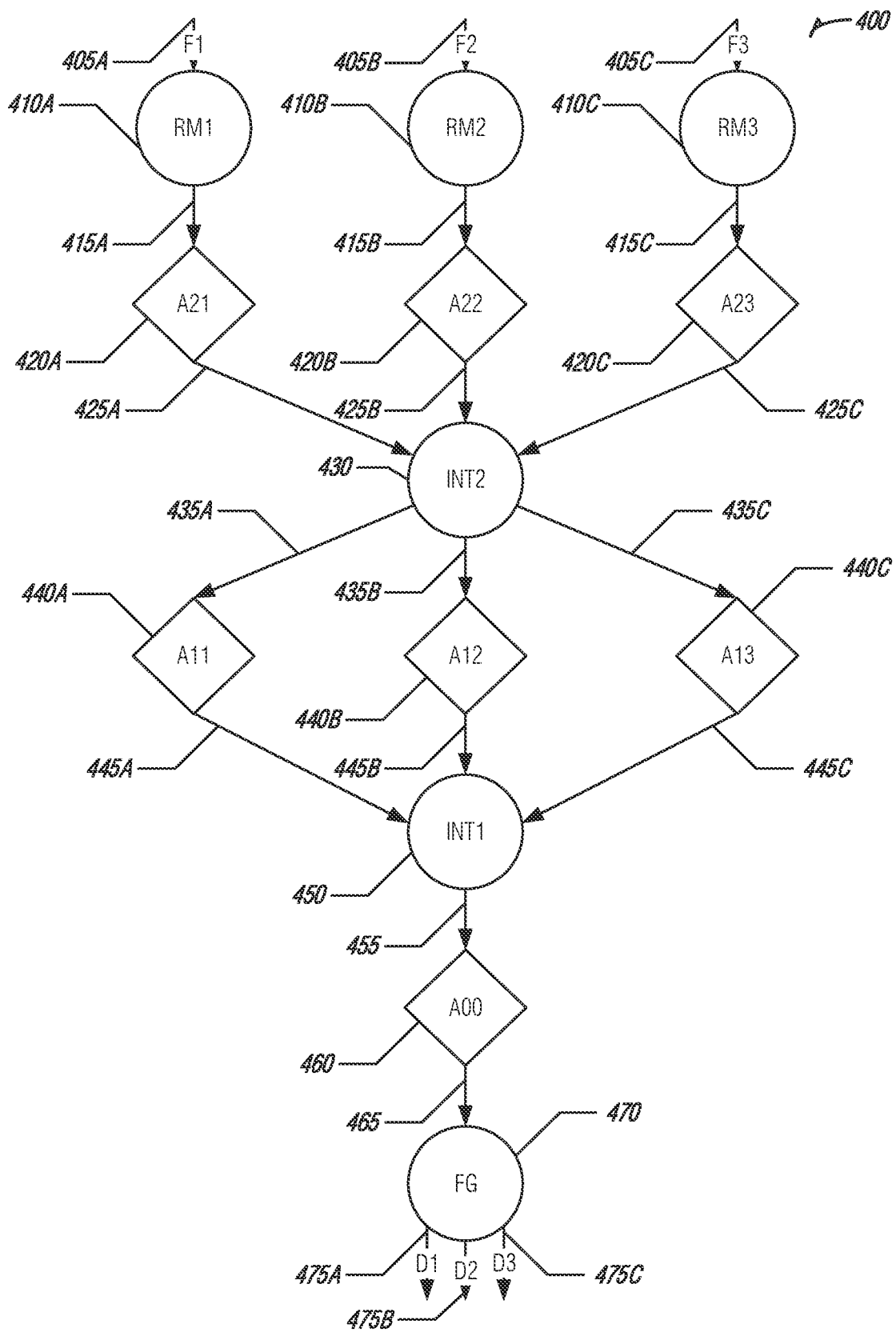
FIG. 4 illustrates an example of a flow plan diagram for dynamic memoryless demand-supply pegging, according to an embodiment.

FIG. 4 illustrates an example of a flow plan diagram 400 for dynamic memoryless demand-supply pegging, according to an embodiment. The flow plan diagram 400 may include inflow 405A flowing into material node 410A with outflow 415A flowing into activity node 420A with outflow 425A flowing into material node 430, inflow 405B flowing into material node 410B with outflow 415B flowing into activity node 420B with outflow 425B flowing into material node 430, and inflow 405C flowing into material node 410C with outflow 415C flowing into activity node 420C with outflow 425C flowing into material node 430. Material node 430 may have outflow 435A that flows into activity node 440A with outflow 445A flowing to material node 450, outflow 435B that flows into activity node 440B with outflow 445B flowing to material node 450, and outflow 435C that flows into activity node 440C with outflow 445C flowing to material node 450. Material node 450 may have outflow 455 which flows into activity node 460 with outflow 465 that flows to material node 470. Material node 470 may include demand outflow 475A, demand outflow 475B, and demand outflow 475C.

The flow plan diagram 400 may be a supply chain map generated and displayed by the supply chain mapping engine 305 as described in FIG. 3. A user may select a demand such as, for example demand outflow 475B and the demand may be pegged to a supply as described in FIG. 3. The pegging process may identify and evaluate the priority of other demands. For example, the user may select outflow demand 475B to peg. It may be determined that the material node 470 also includes outflow demand 475A with a higher priority than outflow demand 475B and outflow demand 475C with a lower priority than outflow demand 475B.

The pegging process may peg demand to supply at each material node. Thus, calculation may be made at each material node to evaluate a quantity of units to skip (q2s) and a quantity of units to peg (q2p). At material node 470, the inventory may be zero for the time bucket. The consumption for outflow demand 475C may be seventy units. A value may be calculated for units to skip as seventy (e.g., 0 units of inventory+70 units for the lower priority demand outflow 475C). The quantity to peg may be calculated to be forty units (e.g., the consumption of demand outflow 475B for the time bucket).

At material node 450, inventory may be zero and there may be no lower priority demand. The q2s may be calculated by adding the q2s from material node 470 of seventy units to the zero inventory at material node 450 and zero representing no lower priority demands to equal seventy. The outflow 445C from activity node 440C may include fifty units and the fifty units may be skipped based on the q2s value of seventy units. In an example, the outflow 445C may be skipped first because it has a higher priority than outflow 445B and outflow 445A. In an example, the priority levels may be based on a priority level of an activity node corresponding to an outflow. The quantity to skip is then lowered by subtracting the number of skipped units from the q2s value. In the example, the new q2s value is now twenty (e.g., previous q2s 70–50 skipped units).

The outflow 445B from activity node 440B may have a production of fifty units. The production value is greater than the q2s value so an upstream q2p value will be calculated. The upstream q2p value is calculated by subtracting the q2s value from the unit production value for an outflow. In the example, the new q2p value is thirty (e.g., outflow 445B production value of 50 units–q2s 20 units).

At material node 430, the inventory may be zero. The q2s value is calculated as seventy (e.g., q2s of 20 units+0 units of inventory+the consumption of activity node 440C of 50 units). As noted previously, the q2p value is currently thirty. Outflow 425C may have a production value of thirty units, outflow 425B may have a production value of fifty units, and outflow 425A may have a production value of seventy units. Units of outflow 425C may be processed first (e.g., based on a higher priority than outflow 425B, etc.) and the thirty units of production for outflow 435C may be skipped. Outflow 425B may be processed by skipping forty units of production (e.g., q2s of 70–30 units skipped at outflow 425C). The remaining ten units of production for outflow 425B and twenty units of production from outflow 425A are pegged to the demand outflow 475B. The q2p and q2s values are now adjusted. The q2s value is now equal to zero (e.g., previous q2s value of 70-70). The q2p value is calculated as ten (e.g., previous q2p value of 40-30 units already pegged).

There are no nodes left to process and there is a remaining q2p value so the process is run again for material node 430 with the q2p value now equal to ten. The q2s value is calculated as one hundred (e.g., previous q2s value of 0+inventory 0+consumption of activity node 440B and activity node 440C of 100). As previously stated, outflow 425C has a production value of thirty units, outflow 425B has an outflow of fifty units, and outflow 425A has a production value of seventy units. All thirty units of production for outflow 425C may be skipped as well as all fifty units of production of outflow 425B, and twenty units of production from outflow 425A. The following ten units of production for outflow 425A are pegged to the demand outflow 475B. Thus, ten units (e.g., previously pegged) from outflow 425B and thirty units (e.g., 10 units+the previously pegged 20 units) from outflow 425A have been pegged to demand outflow 475B.

Figure 5:
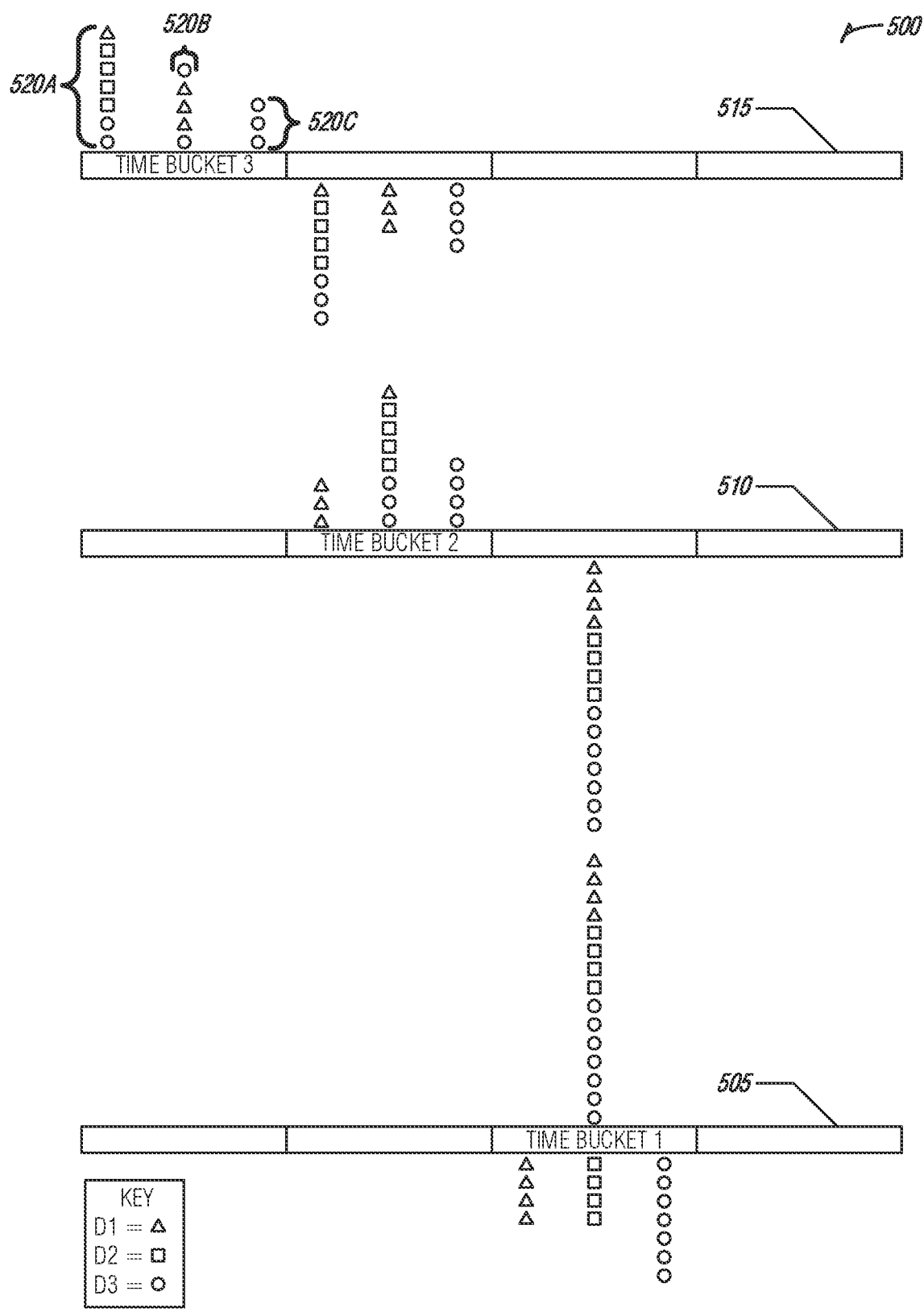
FIG. 5 illustrates an example of a pegging diagram for dynamic memoryless demand-supply pegging, according to an embodiment.

FIG. 5 illustrates an example of a pegging diagram 500 for dynamic memoryless demand-supply pegging, according to an embodiment. The pegging diagram 500 may be an example of an output of dynamic memoryless demand-supply pegging as described in FIGS. 1-4. The pegging diagram 500 illustrates demand pegged for three demands (D1, D2, and D3) at a first node level 505 (e.g., for material node 470 as described in FIG. 4), a second node level 510 (e.g., for material node 450 as described in FIG. 4), and a third node level 515 (e.g., for material node 430 as described in FIG. 4). At the third node level 515, the demands may be pegged to supply inflow 520A, supply inflow 520B, and supply inflow 520C. The three demands D1, D2, D3 may be pegged by breaking them up to the atomic level. The pegging diagram represents four time buckets (e.g., four consecutive days of the week, etc.). There may be a one bucket lead time as demand is propagated upstream from first node level 505 to second node level 510 and from second node level 510 to third node level 515

Each demand may be pegged individually (or in parallel). As shown in the pegging diagram 500, demand D1 is a demand for four units, demand D2 is a demand for four units, and demand D3 is a demand of seven units. The priority of demand D1 is highest followed by demand D2 with demand D3 having the lowest priority. In the pegging diagram 500, each unit of supply has a priority order-units to the left are of higher priority than the units to the right and units lower in a column have a higher priority than those higher in the column. Thus, regardless of the order in which the demands are pegged supply is skipped and pegged taking priority of demands and supplies into consideration.

The processing of the demand D2 may result in four units of supply at the first node level 505 being pegged to demand D2 after skipping seven units of supply for demand D3. At the second node level 510, there may be three supply sources. The first supply source may be processed and all four units of the first supply may be skipped and the first three units of the second supply may be skipped (e.g., for supply of demand D3). The next four units may be pegged to demand D2. The remaining units may be skipped (or unprocessed) (e.g., remaining supply for demand D1). At the third node level 515, there may again be three supply sources. The first supply source 520C of three units may be skipped along with one of the units of the second supply source 520B representing the four units skipped in the first supply source for demand D3 at the second node level 510. The next three units of the second supply source 520B may be skipped representing the three units skipped from the third supply source at the second node level 510 for demand D1. The fifth unit of the second supply source 520B and the first two units of the third supply source 520A may be skipped representing the three units skipped in the second supply source at the second node level 510 for demand D3. The next four units of the third supply source 520A may be pegged to demand D2 leaving the final unit of the third supply source for pegging to demand D1.

The processing of the demand D1 may result in four units of supply at the first node level 505 being pegged to demand D2 after skipping seven units of supply for demands D2 and D3. At the second node level 510, there may be three supply sources. The first supply source may be processed and all four units of the first supply may be skipped and the first seven units of the second supply may be skipped (e.g., for supply of demands D2 and D3). The last unit of the second supply source and all three units of the third supply source may be pegged to demand D1. At the third node level 515, there may again be three supply sources. The first supply source 520C of three units may be skipped along with one of the units of the second supply source 520B representing the four units skipped in the first supply source for demand D3 at the second node level 510. The next three units of the second supply source 520B may be pegged to the demand D1 representing the three units pegged from the third supply source at the second node level 510 for demand D1. The fifth unit of the second supply source 520B and the first six units of the third supply source 520A may be skipped representing the three units skipped in the second supply source at the second node level 510 for demand D3 and the four units skipped in the second supply source for demand D2. The final unit of the third supply source 520A may be pegged to demand D1.

The processing of the demand D3 may result in the first four units of supply at the first node level 505 being pegged to demand D3. The remainder of the units are skipped (or unprocessed)(to be pegged to demands D1 and D2). At the second node level 510, there may be three supply sources. The first supply source may be processed and all four units of the first supply and the first three units of the second supply may be pegged to demand D3. The remaining units may be skipped (or unprocessed) (e.g., remaining supply for demands D1 and D2). At the third node level 515, there may again be three supply sources. The first supply source 520C of three units may be pegged to D1 along with the first unit of the second supply source 520B representing the four units pegged in the first supply source for demand D3 at the second node level 510. The next three units of the second supply source 520B may be skipped representing the three units skipped from the third supply source at the second node level 510 (e.g., for demand D1). The fifth unit of the second supply source 520B and the first two units of the third supply source 520A may be pegged to demand D3 representing the three units pegged in the second supply source at the second node level 510 for demand D3. The remaining units of the third supply source 520A may be skipped (or unprocessed) leaving the final units of the third supply source for pegging to demands D1 and D2.

Figure 6:
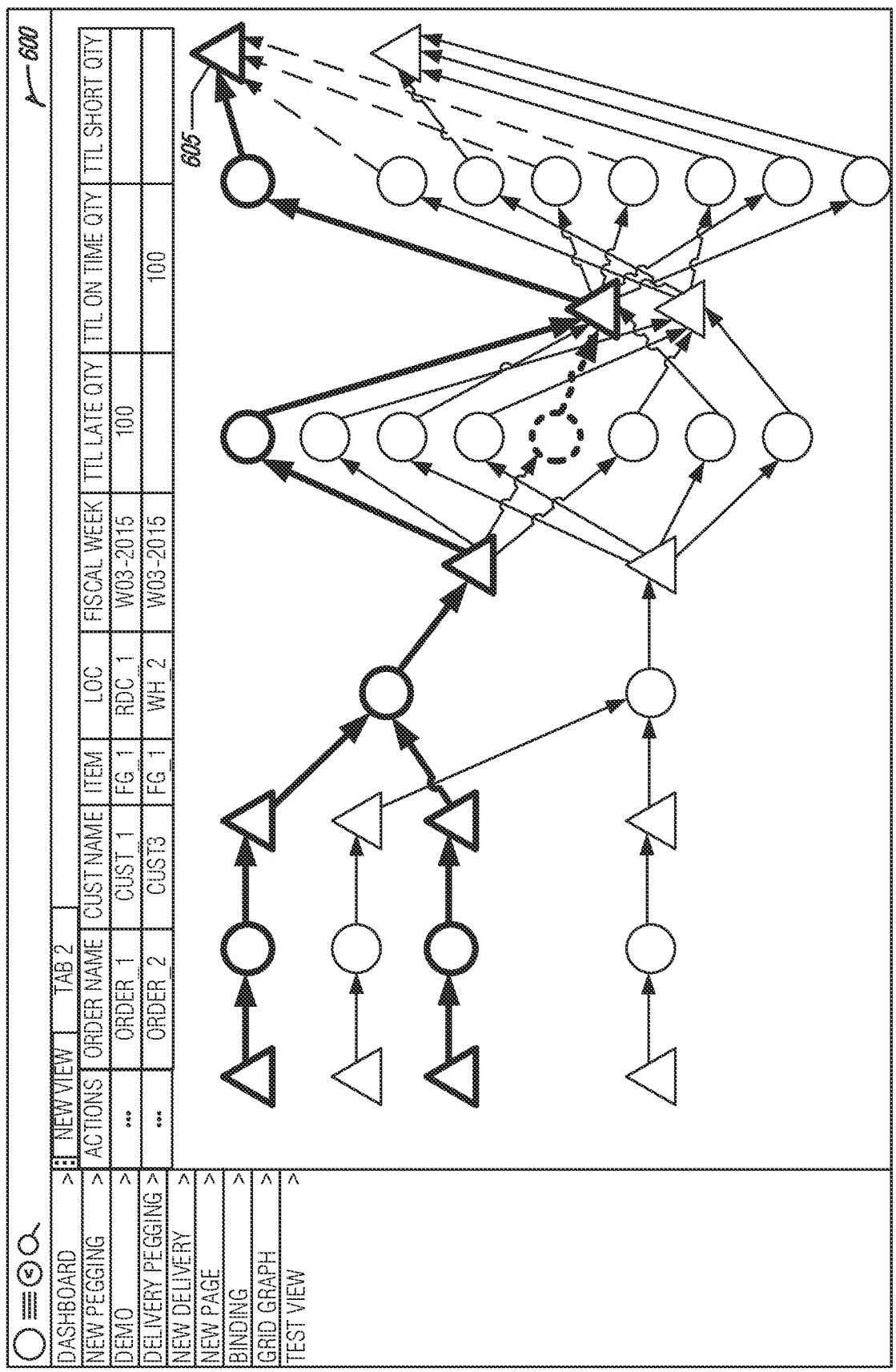
FIG. 6 illustrates an example of an interactive pegging visualization user interface for dynamic memoryless demand-supply pegging, according to an embodiment.

FIG. 6 illustrates an example of an interactive pegging visualization user interface 600 for dynamic memoryless demand-supply pegging, according to an embodiment. The user interface 600 may provide features as described in FIGS. 1-5. The user interface 600 may include a variety of customizable interactive features such as, for example, a grid and a graph. A user may configure the page using a variety of customization tools such as, for example, display filters, content filters, resizing tools, etc.

When a user clicks on a particular demand such as demand 605, a path to which it is pegged to may be highlighted. There can be many different static network paths that may be identified as meeting the demand 605. The path from where the demand is met (e.g., after considering simultaneous rules for material, capacity, constraints, etc.) may be highlighted as a bold path.

Constraints on preventing supply from meeting the demand 605 may be highlighted (e.g., the dotted portion of the path). On each edge the user may reference the resultant pegging output to identify the pegged quantity for that demand. The user interface 600 provides users with a visual representation of the demand pegging output so that they may quickly identify pegged supply and identify constraints interfering with the supply chain.

Figure 7:
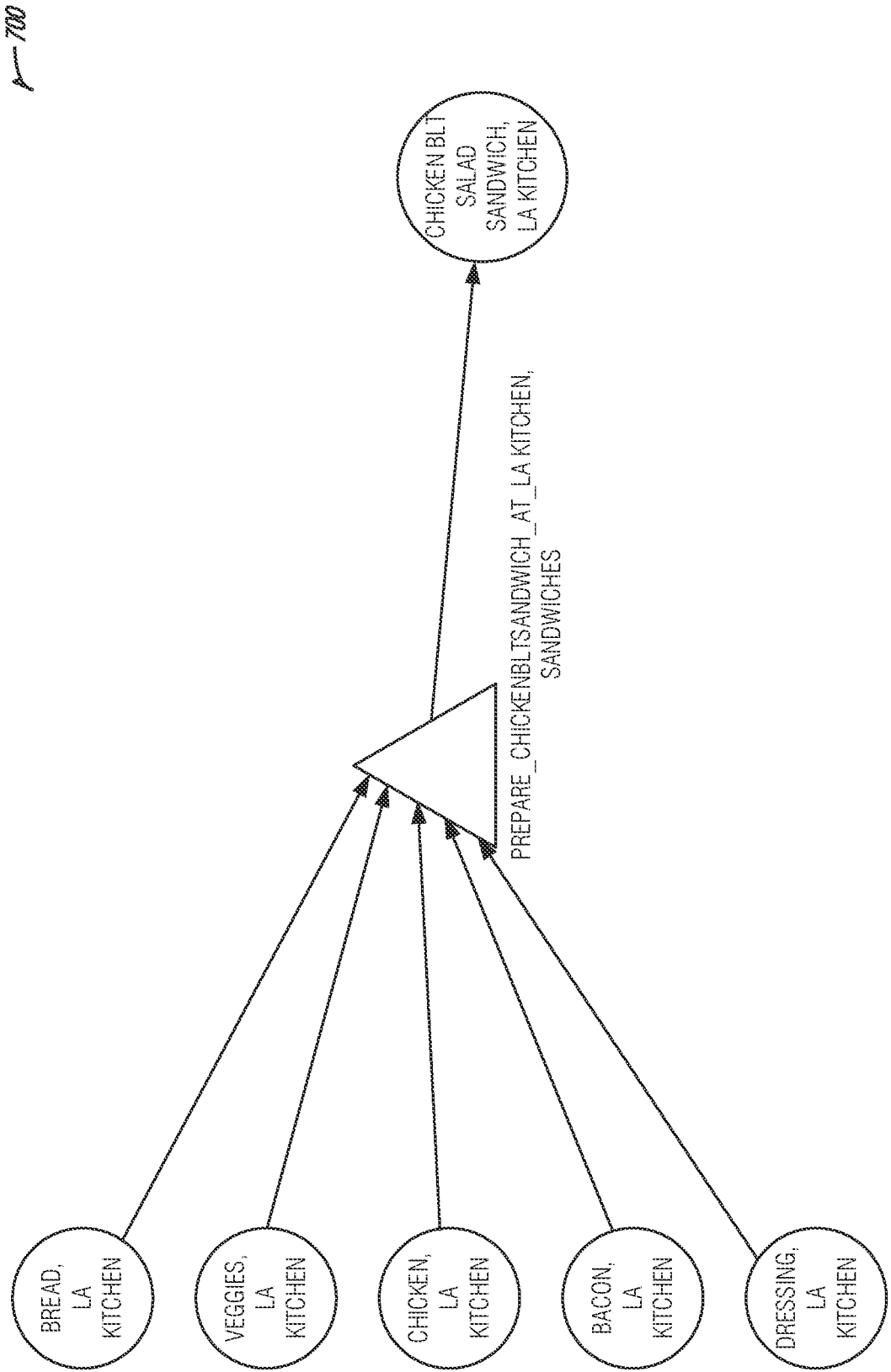
FIG. 7 illustrates an example of an interactive node and edge creation user interface for dynamic memoryless demand-supply pegging, according to an embodiment.

FIG. 7 illustrates an example of an interactive node and edge creation user interface 700 for dynamic memoryless demand-supply pegging, according to an embodiment. The user interface 700 may provide features as described in FIGS. 1-6. The user interface 700 may provide a user with the ability to configure node shapes and paths. In addition, the user may be provided with a variety of controls to upload graphics such as images to be placed in the node. This may make is easier for a user to recognize and interpret the demand pegging output. The user interface 700 may also provide an expand-collapse feature on a node that allows user to build the network incrementally to meet various preferences that may result in better comprehension.

Figure 8:
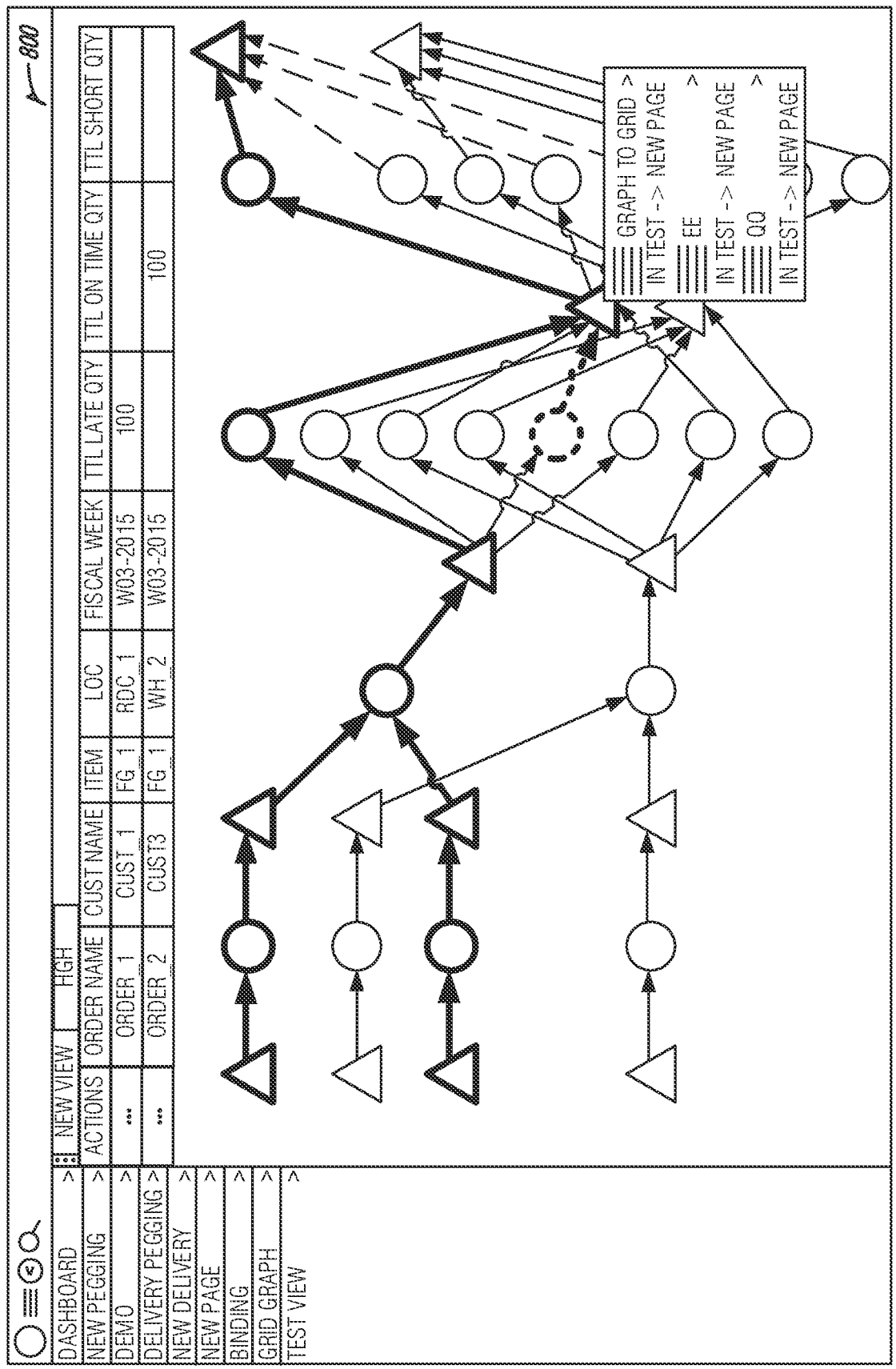
FIG. 8 illustrates an example of a dynamic navigation user interface for dynamic memoryless demand-supply pegging, according to an embodiment.

FIG. 8 illustrates an example of a dynamic navigation user interface 800 for dynamic memoryless demand-supply pegging, according to an embodiment. The user interface 800 may provide features as described in FIGS. 1-7. The user interface 800 may provide a user with navigational controls allowing navigation between any node and additional information relating to the node. For example, the user may be able to click on a node and may be provided with a context box including further details and actions that may be performed for the node.

Figure 9:
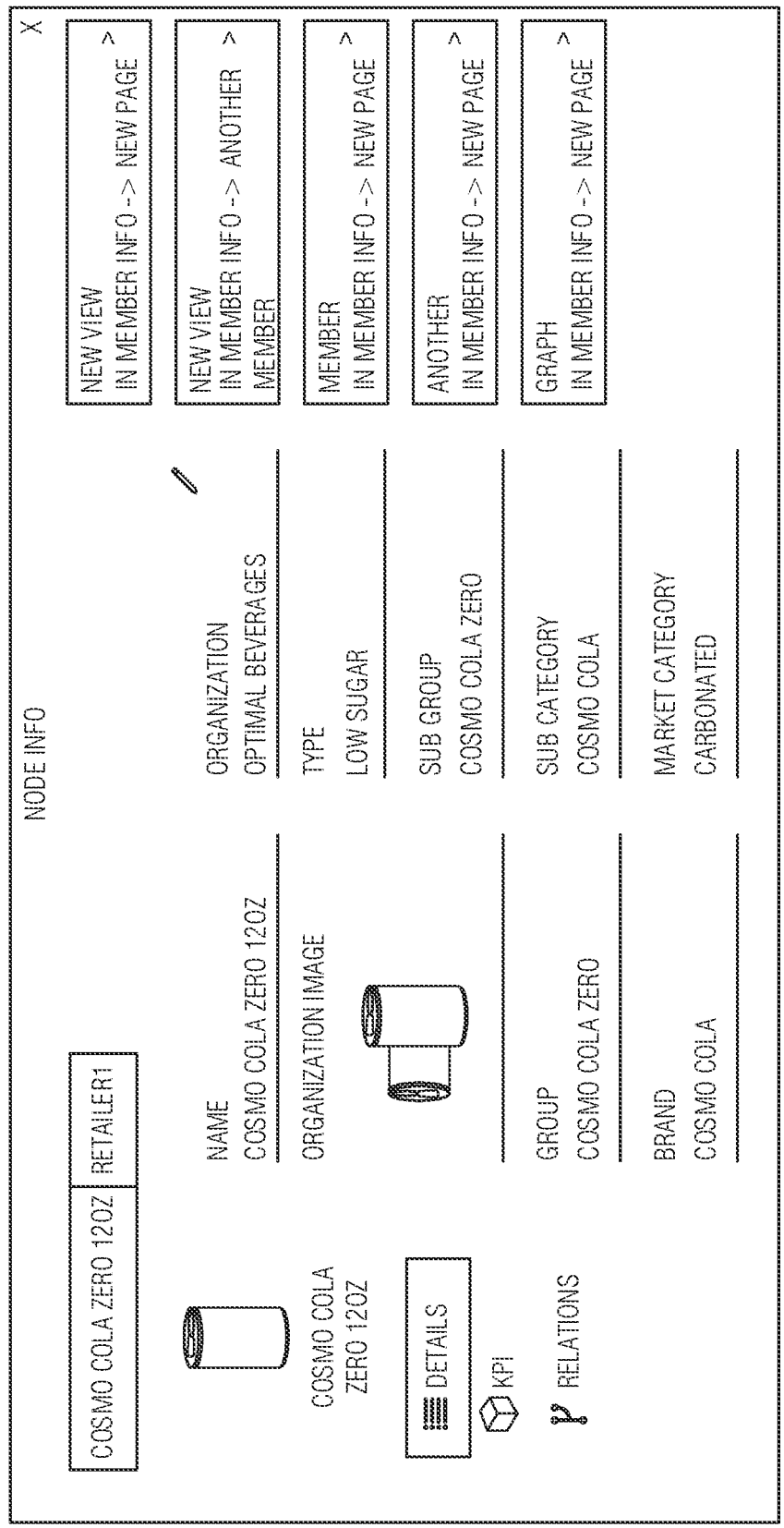
FIG. 9 illustrates an example of an interactive node information user interface for dynamic memoryless demand-supply pegging, according to an embodiment.

FIG. 9 illustrates an example of an interactive node information user interface 900 for dynamic memoryless demand-supply pegging, according to an embodiment. The user interface 900 may provide features as described in FIGS. 1-8. The user interface 900 may provide a variety of controls allowing the user to get additional information and navigational links that may be configured for a node.

Figure 10:
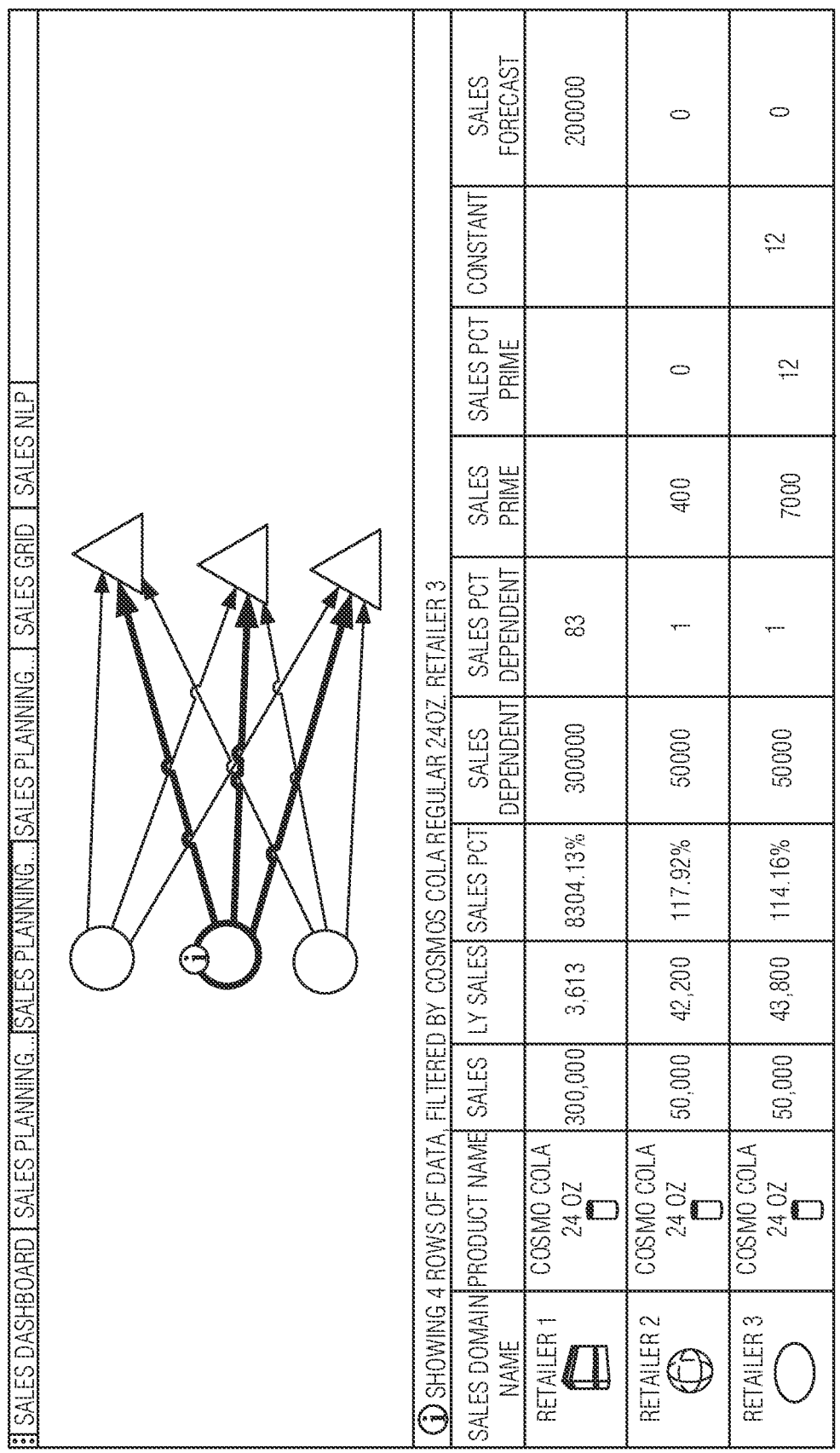
FIG. 10 illustrates an example of an intra-view widget binding user interface for dynamic memoryless demand-supply pegging, according to an embodiment.

FIG. 10 illustrates an example of an intra-view widget binding user interface 1000 for dynamic memoryless demand-supply pegging, according to an embodiment. The user interface 1000 may provide features as described in FIGS. 1-9. The user interface 1000 may include a variety of controls that provide a user with the ability to pass context from a node in a displayed supply chain graph and a grid control. For example, a user may click on a material node and a grid including an inventory plan may be displayed in the bottom of the user interface 1000. The user may then click on a delivery node and the delivery plan details may be displayed.

Figure 11:
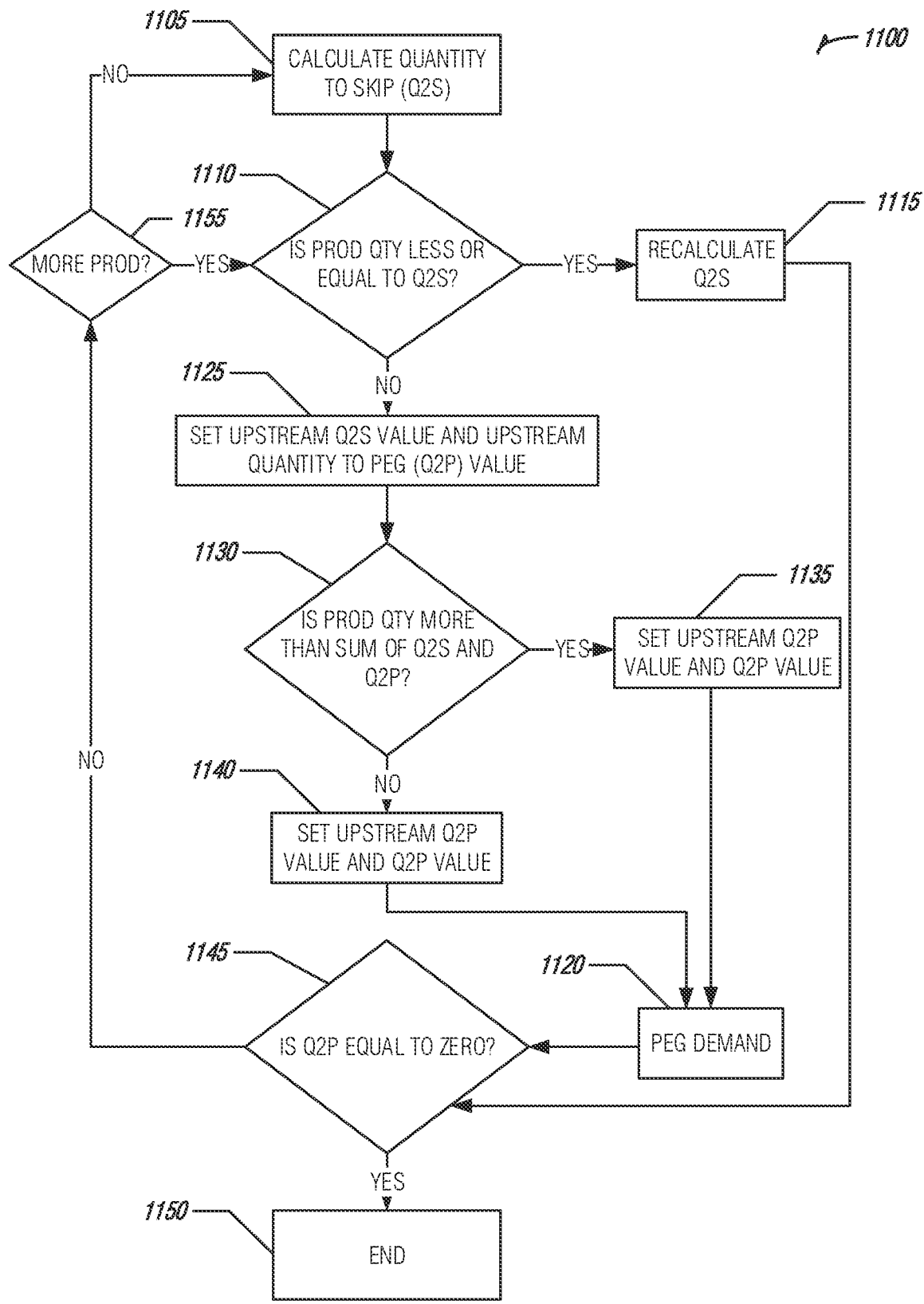
FIG. 11 illustrates an example of a process for dynamic memoryless demand-supply pegging, according to an embodiment.

FIG. 11 illustrates an example of a process 1100 for dynamic memoryless demand-supply pegging, according to an embodiment. The process 1100 may provide features as described in FIGS. 1-10. Each supply at each node level between a demand and supplies able to fulfill the demand along a supply chain may be processed using the process 1100 to peg the demand to the supplies for a time bucket (e.g., production time period, etc.).

A quantity of units to skip (q2s) may be calculated by adding a current quantity to skip to inventory for the time bucket and lower priority consumptions for the bucket (e.g., other demands, etc.) (e.g., at operation 1105). Each production of the supply may be processed to determine if the production quantity is less than or equal to the quantity to skip (e.g., at decision 1110). If so, the quantity to skip may be recalculated (e.g., at operation 1115) and it may be determined if the remaining quantity to peg (q2p) is equal to zero (e.g., at decision 1145). If so, the process 1100 ends at operation 1150. If not, it will be determined if additional productions are available for the supply (e.g., at decision 1155). If so, the next production may be processed (e.g., starting at decision 1110). If not, the next supply may be processed (e.g., starting at operation 1105).

If it is determined that the production quantity is not less than or equal to the q2s (e.g., at decision 1110), an upstream q2s value may be set equal to the current q2s value and an upstream q2p value may be set to zero (e.g., at operation 1125). It may be determined if the production quantity is more than the sum for the q2p and the q2s values (e.g., at decision 1130). If so, the upstream q2p value may be set to the production quantity minus the q2s value and the q2p value may be set to the current q2p value minus the upstream q2p value (e.g., at operation 1135). If not, the upstream q2p value may be set to the current q2p value and the q2p value may be set to zero (e.g., at operation 1140). The demand may be pegged (e.g., at operation 1120) as it has been determined that there is more than the skipped quantity available for the production.

It may be determined if the q2p value is equal to zero (e.g., at operation 1145). If so, the process 1100 ends at operation 1150 as there is not demand left to be pegged. If not, it will be determined if additional productions are available for the supply (e.g., at decision 1155). If so, the next production may be processed (e.g., starting at decision 1110). If not, the next supply may be processed (e.g., starting at operation 1105). The process 1100 continues until the demand is pegged (e.g., q2p=0).

Figure 12:
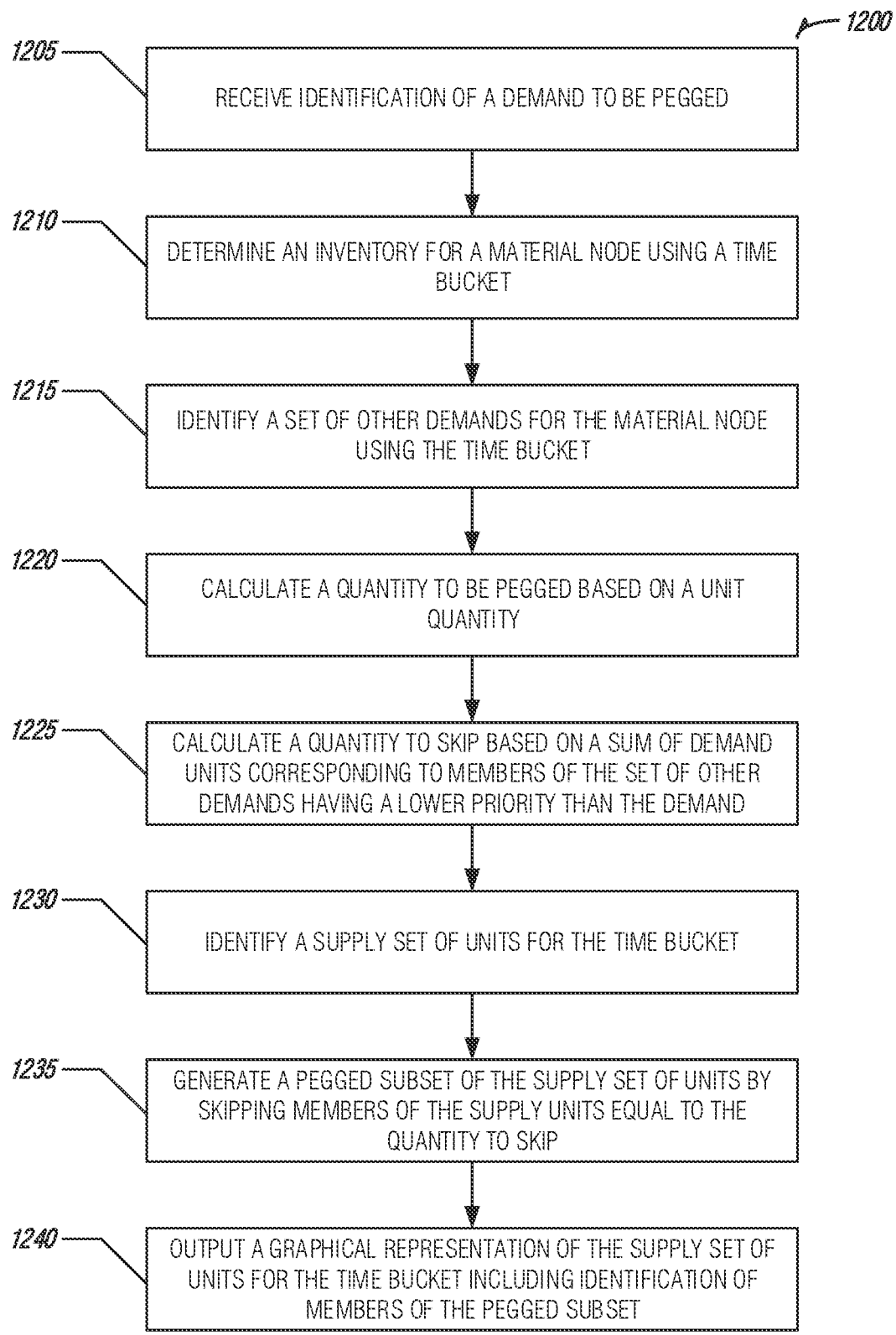
FIG. 12 illustrates an example of a flow diagram of a method for dynamic memoryless demand-supply pegging, according to an embodiment.

FIG. 12 illustrates an example flow diagram of a method 1200 for dynamic memoryless demand-supply pegging, according to an embodiment. The method 1200 may provide features as described in FIGS. 1-11.

An identification of a demand to be pegged may be received (e.g., at operation 1205). The identification may include a material node, a unit quantity, and a time bucket for the demand. In an example, the identification may be received via a supply chain management graphical user interface.

An inventory may be determined for the material node using the time bucket (e.g., at operation 1210).

A set of other demands may be identified for the material node using the time bucket (e.g., at operation 1215). In an example, a priority may be assigned to each member of the set of other demands. In an example, members of the set of other demands corresponding to actual demands may be assigned a higher priority than members of the set of other demands corresponding to flow plan demands. In an example, the members of the set of other demands corresponding to actual demands are assigned a priority based on an actual demand priority corresponding to respective of the actual demands. In another example, the members of the set of other demands corresponding to flow plan demands are assigned a priority based on an activity priority corresponding to an activity node corresponding with respective of the flow plan demands.

A quantity to be pegged may be calculated based on the unit quantity (e.g., at operation 1220).

A quantity to skip may be calculated based on the sum of demand units corresponding to members of the set of other demands having a lower priority than the demand (e.g., at operation 1225). In an example, the quantity to skip may depend on a dynamic inventory profile of the material node.

A supply set of units may be identified for the time bucket (e.g., at operation 1230). In an example, the supply set of units may be ordered based on an inventory status identifier of each member of the supply set of units. In an example, members of the supply set of units having an inventory status identifier of beginning on hand may be ordered first, members of the supply set of units having an inventory status identifier of expected receipts may be ordered next, and the remaining members may be ordered based on an activity priority corresponding to respective of the remaining members.

A pegged subset of the supply set of units may be generated by skipping members of the supply set of units equal to the quantity to skip (e.g., at operation 1235). In an example, the number of members in the pegged subset may be equal to the quantity to be pegged.

A graphical representation of the supply set of units for the time bucket may be generated and output for display that includes identification of the members of the pegged subset (e.g., at operation 1240). In an example, the output may be displayed output for display in a supply chain management application graphical user interface.

In an example, the demand, other demands, and supply set of units may be represented in a network graph including nodes representing demands and supplies and edges representing connection between the nodes. In an example, the network graph may be stored in a computer readable format and may be used to peg the demand to members of the supply set of units. In an example, the network graph may be implemented on a big data computing system including a cluster of computing devices and a distributed file systems. For example, the process 1100 as described in FIG. 11 may be used to peg the demand to the members of the supply set of units. In an example, the pegged subset of the supply may be generated without pegging any other demands to the supply set of units. In an example, a change may be detected in the network graph and the pegging may be updated by regenerating the pegged subset of the supply set of units corresponding with the change. In an example, a second demand may be pegged simultaneously with the demand.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that causes the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

ADDITIONAL NOTES & EXAMPLES

Example 1 is a system for pegging a demand to a supply in a supply chain, the system comprising: at least one processor; and memory including instructions that, when executed by the at least one processor, cause the at least one processor to perform operations to: receive an identification of a first demand to be pegged, the identification including a material node, a unit quantity, and a time bucket for the first demand; determine an inventory for the material node at the time bucket; identify a set of other demands for the material node at the time bucket; calculate a quantity to be pegged based on the unit quantity; calculate a quantity to skip based on a sum of demand units corresponding to members of the set of other demands having a lower priority than the first demand added to the inventory; identify a supply set of units for the time bucket; generate a pegged subset of the supply set of units by skipping members of the supply set of units equal to the quantity to skip, wherein the number of members in the pegged subset is equal to the quantity to be pegged; and output for display in a supply chain management application graphical user interface, a graphical representation of the supply set of units for the time bucket including identification of members of the pegged subset.

In Example 2, the subject matter of Example 1 optionally includes wherein the identification is received via the supply chain management graphical user interface.

In Example 3, the subject matter of any one or more of Examples 1-2 optionally include instructions to assign a priority to each member of the set of other demands.

In Example 4, the subject matter of Example 3 optionally includes wherein members of the set of other demands corresponding to actual demands are assigned a higher priority than members of the set of other demands corresponding to flow plan demands.

In Example 5, the subject matter of Example 4 optionally includes wherein the members of the set of other demands corresponding to actual demands are assigned a priority based on an actual demand priority corresponding to respective of the actual demands.

In Example 6, the subject matter of any one or more of Examples 4-5 optionally include wherein the members of the set of other demands corresponding to flow plan demands are assigned a priority based on an activity priority corresponding to an activity node corresponding with respective of the flow plan demands.

In Example 7, the subject matter of any one or more of Examples 1-6 optionally include wherein the instructions to generate the pegging subset further comprises instructions to: order the supply set of units based on an inventory status identifier of each member of the supply set of units.

In Example 8, the subject matter of Example 7 optionally includes wherein members of the supply set of units that have an inventory status identifier of beginning on hand are ordered first, members of the supply set of units having an inventory status identifier of expected receipts are ordered next, and the remaining members are ordered based on an activity priority corresponding to respective of the remaining members.

In Example 9, the subject matter of any one or more of Examples 1-8 optionally include instructions to: generate a supply chain network model representing the supply chain; create the material node and a first demand node in the supply chain network model; and generate an edge between the material node and the first demand node, wherein the edge represents a supply-demand relationship between the material node and the first demand node, and wherein the material node is at a supply side of the supply-demand relationship and the first demand node is at a demand side of the supply-demand relationship.

In Example 10, the subject matter of Example 9 optionally includes wherein the supply chain network model is distributed across a cloud-based computing network.

In Example 11, the subject matter of Example 10 optionally includes wherein the cloud-based computing network is part of a distributed data storage and processing network.

In Example 12, the subject matter of any one or more of Examples 9-11 optionally includes instructions to: create another material node in the supply chain network model; generate another edge between the material node and the other material node, wherein the other edge represents a supply-demand relationship between the material node and the second material node, and wherein the other material node is at a supply side of the supply-demand relationship and the other material node is at a demand side of the supply-demand relationship; and peg a supply for a time bucket of the other material node using a set of demands from the material node.

In Example 13, the subject matter of any one or more of Examples 1-12 optionally include instructions to: identify a change to the set of demands; and adjust the pegged subset based on the identified change.

In Example 14, the subject matter of any one or more of Examples 1-13 optionally include instructions to: identify a change to the supply set of units for the supply chain; and modify the pegged subset based on the identified change.

In Example 15, the subject matter of any one or more of Examples 1-14 optionally include instructions to: receive an identification of a second demand to be pegged; and process the second demand similar to the first demand.

Example 16 is at least one computer-readable medium including instructions for pegging a demand to a supply in a supply chain that, when executed by at least one processor, cause the at least one processor to perform operations to: receive an identification of a first demand to be pegged, the identification including a material node, a unit quantity, and a time bucket for the first demand; determine an inventory for the material node at the time bucket; identify a set of other demands for the material node at the time bucket; calculate a quantity to be pegged based on the unit quantity; calculate a quantity to skip based on a sum of demand units corresponding to members of the set of other demands having a lower priority than the first demand added to the inventory; identify a supply set of units for the time bucket; generate a pegged subset of the supply set of units by skipping members of the supply set of units equal to the quantity to skip, wherein the number of members in the pegged subset is equal to the quantity to be pegged; and output for display in a supply chain management application graphical user interface, a graphical representation of the supply set of units for the time bucket including identification of members of the pegged subset.

In Example 17, the subject matter of Example 16 optionally includes wherein the identification is received via the supply chain management graphical user interface.

In Example 18, the subject matter of any one or more of Examples 16-17 optionally include instructions to assign a priority to each member of the set of other demands.

In Example 19, the subject matter of Example 18 optionally includes wherein members of the set of other demands corresponding to actual demands are assigned a higher priority than members of the set of other demands corresponding to flow plan demands.

In Example 20, the subject matter of Example 19 optionally includes wherein the members of the set of other demands corresponding to actual demands are assigned a priority based on an actual demand priority corresponding to respective of the actual demands.

In Example 21, the subject matter of any one or more of Examples 19-20 optionally include wherein the members of the set of other demands corresponding to flow plan demands are assigned a priority based on an activity priority corresponding to an activity node corresponding with respective of the flow plan demands.

In Example 22, the subject matter of any one or more of Examples 16-21 optionally include wherein the instructions to generate the pegging subset further comprises instructions to: order the supply set of units based on an inventory status identifier of each member of the supply set of units.

In Example 23, the subject matter of Example 22 optionally includes wherein members of the supply set of units that have an inventory status identifier of beginning on hand are ordered first, members of the supply set of units having an inventory status identifier of expected receipts are ordered next, and the remaining members are ordered based on an activity priority corresponding to respective of the remaining members.

In Example 24, the subject matter of any one or more of Examples 16-23 optionally include instructions to: generate a supply chain network model representing the supply chain; create the material node and a first demand node in the supply chain network model; and generate an edge between the material node and the first demand node, wherein the edge represents a supply-demand relationship between the material node and the first demand node, and wherein the material node is at a supply side of the supply-demand relationship and the first demand node is at a demand side of the supply-demand relationship.

In Example 25, the subject matter of Example 24 optionally includes wherein the supply chain network model is distributed across a cloud-based computing network.

In Example 26, the subject matter of Example 25 optionally includes wherein the cloud-based computing network is part of a distributed data storage and processing network.

In Example 27, the subject matter of any one or more of Examples 24-26 optionally include instructions to: create another material node in the supply chain network model; generate another edge between the material node and the other material node, wherein the other edge represents a supply-demand relationship between the material node and the second material node, and wherein the other material node is at a supply side of the supply-demand relationship and the other material node is at a demand side of the supply-demand relationship, and peg a supply for a time bucket of the other material node using a set of demands from the material node.

In Example 28, the subject matter of any one or more of Examples 16-27 optionally include instructions to: identify a change to the set of demands; and adjust the pegged subset based on the identified change.

In Example 29, the subject matter of any one or more of Examples 16-28 optionally include instructions to: identify a change to the supply set of units for the supply chain; and modify the pegged subset based on the identified change.

In Example 30, the subject matter of any one or more of Examples 16-29 optionally include instructions to: receive an identification of a second demand to be pegged; and process the second demand similar to the first demand.

Example 31 is a method for pegging a demand to a supply in a supply chain, the method comprising: receiving an identification of a first demand to be pegged, the identification including a material node, a unit quantity, and a time bucket for the first demand; determining an inventory for the material node at the time bucket; identifying a set of other demands for the material node at the time bucket; calculating a quantity to be pegged based on the unit quantity; calculating a quantity to skip based on a sum of demand units corresponding to members of the set of other demands having a lower priority than the first demand added to the inventory; identifying a supply set of units for the time bucket; generating a pegged subset of the supply set of units by skipping members of the supply set of units equal to the quantity to skip, wherein the number of members in the pegged subset is equal to the quantity to be pegged; and outputting for display in a supply chain management application graphical user interface, a graphical representation of the supply set of units for the time bucket including identification of members of the pegged subset.

In Example 32, the subject matter of Example 31 optionally includes wherein the identification is received via the supply chain management graphical user interface.

In Example 33, the subject matter of any one or more of Examples 31-32 optionally include assigning a priority to each member of the set of other demands.

In Example 34, the subject matter of Example 33 optionally includes wherein members of the set of other demands corresponding to actual demands are assigned a higher priority than members of the set of other demands corresponding to flow plan demands.

In Example 35, the subject matter of Example 34 optionally includes wherein the members of the set of other demands corresponding to actual demands are assigned a priority based on an actual demand priority corresponding to respective of the actual demands.

In Example 36, the subject matter of any one or more of Examples 34-35 optionally include wherein the members of the set of other demands corresponding to flow plan demands are assigned a priority based on an activity priority corresponding to an activity node corresponding with respective of the flow plan demands.

In Example 37, the subject matter of any one or more of Examples 31-36 optionally include wherein generating the pegging subset further comprises: ordering the supply set of units based on an inventory status identifier of each member of the supply set of units.

In Example 38, the subject matter of Example 37 optionally includes wherein members of the supply set of units having an inventory status identifier of beginning on hand are ordered first, members of the supply set of units having an inventory status identifier of expected receipts are ordered next, and the remaining members are ordered based on an activity priority corresponding to respective of the remaining members.

In Example 39, the subject matter of any one or more of Examples 31-38 optionally include generating a supply chain network model representing the supply chain; creating the material node and a first demand node in the supply chain network model; and generating an edge between the material node and the first demand node, wherein the edge represents a supply-demand relationship between the material node and the first demand node, and wherein the material node is at a supply side of the supply-demand relationship and the first demand node is at a demand side of the supply-demand relationship.

In Example 40, the subject matter of Example 39 optionally includes wherein the supply chain network model is distributed across a cloud-based computing network.

In Example 41, the subject matter of Example 40 optionally includes wherein the cloud-based computing network is part of a distributed data storage and processing network.

In Example 42, the subject matter of any one or more of Examples 39-41 optionally include creating another material node in the supply chain network model; generating another edge between the material node and the other material node, wherein the other edge represents a supply-demand relationship between the material node and the second material node, and wherein the other material node is at a supply side of the supply-demand relationship and the other material node is at a demand side of the supply-demand relationship; and pegging a supply for a time bucket of the other material node using a set of demands from the material node.

In Example 43, the subject matter of any one or more of Examples 31-42 optionally include identifying a change to the set of demands; and adjusting the pegged subset based on the identified change.

In Example 44, the subject matter of any one or more of Examples 31-43 optionally include identifying a change to the supply set of units for the supply chain; and modifying the pegged subset based on the identified change.

In Example 45, the subject matter of any one or more of Examples 31-44 optionally include receiving an identification of a second demand to be pegged; and processing the second demand similar to the first demand.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for dynamic resource demand pegging within a network graph data structure comprising:
at least one processor; and
memory comprising instructions that, when executed by the at least one processor, cause the at least one processor to perform operations to:
generate a node graph within the network graph data structure that includes a set of material nodes, a set of activity nodes, and a set of capacity nodes, wherein the node graph is generated based on edges between members of the set of material nodes, members of the set of activity nodes, and members of the set of capacity nodes along the network graph data structure, wherein at least one of the edges represent an outflow of a particular material node in the set of material nodes to an inflow of a corresponding particular activity node in the set of activity nodes, wherein the set of material nodes are buffer nodes that include attributes for a supply of a resource, and wherein the set of activity nodes are no-carry nodes between respective members of the set of material nodes and members of the set of capacity nodes through which supply attributes flow;
receive an identification of a first demand to be pegged, the identification including attributes that include identification of a material node of the set of material nodes, a unit quantity attribute, and a time bucket attribute for the first demand, wherein the unit quantity attribute is based in part on output of a downstream activity node of the set of activity nodes that shares a downstream edge with the material node, and wherein the time bucket attribute represents a period of consumption of units of the resource by the material node;

in real-time in parallel with a set of other demand pegging processes, independently process the first demand to be pegged by:
  in real-time using parallel processing threads that independently execute demand pegging calculations simultaneously without dependency on sequential processing of other demands, wherein the independently processing includes dynamically managing memory allocation by:
    calculating a first demand pegging without storing output of the demand pegging calculations in memory simultaneously, and selectively flushing completed peggings to disk storage based on available memory allocation;
  identifying a set of other demands for the material node during a time period defined by the time bucket attribute;
  determining a priority level attribute for the first demand based on a priority level attribute for at least one activity node corresponding to the first demand and at least one particular demand in the set of other demands based one a priority level attribute for at least one activity node corresponding to the at least one particular demand;
  determining a resource available inventory attribute for the material node for the time period, the resource available inventory attribute determined in part based on output of an upstream activity node of the set of activity nodes that shares an upstream edge with the material node and an upstream capacity node of the set of capacity nodes that shares an upstream edge with the material node and in part based on the set of other demands having a higher priority attribute value than the first demand;
  calculating a quantity to be pegged attribute based on the unit quantity attribute;
  calculating a quantity to skip attribute based on a sum of demand units corresponding to members of the set of other demands having a lower priority attribute value than the first demand pegged to a quantity of the resource corresponding to the resource available inventory attribute;
  identifying a supply set of units of the resource for the time period;
  generating a pegged subset of the supply set of units of the resource by skipping members of the supply set of units equal to the quantity to skip attribute, wherein a number of members in the pegged subset is equal to the quantity to be pegged attribute; and
  storing a respective quantity to be pegged attribute at each material node associated with the pegged subset;
automatically calculating an alternative inventory path for the supply based on the supply set of units, wherein the alternative inventory path defines a secondary supply of the units to be directed to the material node; and displaying an interactive pegging visualization graphical user interface including a graphical representation of the supply set of units and the secondary supply of the units, wherein the graphical representation is dynamically updated.

2. The system of claim 1, the memory further comprising instructions that, when executed by the at least one processor, cause the at least one processor to perform operations to:
  output, for display in a supply chain management application graphical user interface, a graphical representation of the supply set of units for the time period including identification of members of the pegged subset; and
  automatically transmit an electronic order to a supplier computing system for an additional quantity of the units for delivery to the material node based on the supply set of units.

3. The system of claim 1, the memory further comprising instructions that, when executed by the at least one processor, cause the at least one processor to perform operations to assign a priority to each member of the set of other demands.

4. The system of claim 3, wherein members of the set of other demands corresponding to actual demands are assigned a higher priority than members of the set of other demands corresponding to flow plan demands.

5. The system of claim 4, wherein the members of the set of other demands corresponding to actual demands are assigned a priority based on an actual demand priority corresponding to respective of the actual demands.

6. The system of claim 4, wherein the members of the set of other demands corresponding to flow plan demands are assigned a priority based on an activity priority corresponding to an activity node corresponding with respective of the flow plan demands.

7. The system of claim 1, wherein the instructions to generate the pegged subset further comprises instructions that, when executed by the at least one processor, cause the at least one processor to perform operations to:
  order the supply set of units based on an inventory status identifier of each member of the supply set of units.

8. The system of claim 7, wherein members of the supply set of units having an inventory status identifier of beginning on hand are ordered first, members of the supply set of units having an inventory status identifier of expected receipts are ordered next, and remaining members are ordered based on an activity priority corresponding to respective of the remaining members.

9. At least one non-transitory machine-readable medium including comprising instructions for resource demand pegging within a network graph data structure that, when executed by at least one processor, cause the at least one processor to perform operations to:
  generate a node graph within the network graph data structure that includes a set of material nodes, a set of activity nodes, and a set of capacity nodes, wherein the node graph is generated based on edges between members of the set of material nodes, members of the set of activity nodes, and members of the set of capacity nodes along the network graph data structure, wherein at least one of the edges represent an outflow of a particular material node in the set of material nodes to an inflow of a corresponding particular activity node in the set of activity nodes, wherein the set of material nodes are buffer nodes that include attributes for a supply of a resource, and wherein the set of activity nodes are no-carry nodes between respective members of the set of material nodes and members of the set of capacity nodes through which supply attributes flow;

receive an identification of a first demand to be pegged, the identification including attributes that include identification of a material node of the set of material nodes, a unit quantity attribute, and a time bucket attribute for the first demand, wherein the unit quantity attribute is based in part on output of a downstream activity node of the set of activity nodes that shares a downstream edge with the material node, and wherein the time bucket attribute represents a period of consumption of units of the resource by the material node;

in real-time in parallel with a set of other demand pegging processes, independently process the first demand to be pegged by:

in real-time using parallel processing threads that independently execute demand pegging calculations simultaneously without dependency on sequential processing of other demands, wherein the independently processing includes dynamically managing memory allocation by:

calculating a first demand pegging without storing output of the demand pegging calculations in memory simultaneously, and selectively flushing completed peggings to disk storage based on available memory allocation;

identifying a set of other demands for the material node during a time period defined by the time bucket attribute;

determining a priority level attribute for the first demand based on a priority level attribute for at least one activity node corresponding to the first demand and at least one particular demand in the set of other demands based one a priority level attribute for at least one activity node corresponding to the at least one particular demand;

determining a resource available inventory attribute for the material node for the time period, the resource available inventory attribute determined in part based on output of an upstream activity node of the set of activity nodes that shares an upstream edge with the material node and an upstream capacity node of the set of capacity nodes that shares an upstream edge with the material node and in part based on the set of other demands having a higher priority attribute value than the first demand;

calculating a quantity to be pegged attribute based on the unit quantity attribute;

calculating a quantity to skip attribute based on a sum of demand units corresponding to members of the set of other demands having a lower priority attribute value than the first demand pegged to a quantity of the resource corresponding to the resource available inventory attribute;

identifying a supply set of units of the resource for the time period;

generating a pegged subset of the supply set of units of the resource by skipping members of the supply set of units equal to the quantity to skip attribute, wherein a number of members in the pegged subset is equal to the quantity to be pegged attribute; and storing a respective quantity to be pegged attribute at each material node associated with the pegged subset;

automatically calculating an alternative inventory path for the supply based on the supply set of units, wherein the alternative inventory path defines a secondary supply of the units to be directed to the material node; and displaying an interactive pegging visualization graphical user interface including a graphical representation of the supply set of units and the secondary supply of the units, wherein the graphical representation is dynamically updated.

10. The at least one non-transitory machine-readable medium of claim 9, further comprising instructions that, when executed by the at least one processor, cause the at least one processor to perform operations to:

output, for display in a supply chain management application graphical user interface, a graphical representation of the supply set of units for the time period including identification of members of the pegged subset; and automatically transmit an electronic order to a supplier computing at least one non-transitory machine-readable medium for an additional quantity of the units for delivery to the material node based on the supply set of units.

11. The at least one non-transitory machine-readable medium of claim 9, further comprising instructions that, when executed by the at least one processor, cause the at least one processor to perform operations to assign a priority to each member of the set of other demands.

12. The at least one non-transitory machine-readable medium of claim 11, wherein members of the set of other demands corresponding to actual demands are assigned a higher priority than members of the set of other demands corresponding to flow plan demands.

13. The at least one non-transitory machine-readable medium of claim 12, wherein the members of the set of other demands corresponding to actual demands are assigned a priority based on an actual demand priority corresponding to respective of the actual demands.

14. The at least one non-transitory machine-readable medium of claim 12, wherein the members of the set of other demands corresponding to flow plan demands are assigned a priority based on an activity priority corresponding to an activity node corresponding with respective of the flow plan demands.

15. A method for resource demand pegging within a network graph data structure, the method comprising:

generating a node graph within the network graph data structure that includes a set of material nodes, a set of activity nodes, and a set of capacity nodes, wherein the node graph is generated based on edges between members of the set of material nodes, members of the set of activity nodes, and members of the set of capacity nodes along the network graph data structure, wherein at least one of the edges represent an outflow of a particular material node in the set of material nodes to an inflow of a corresponding particular activity node in the set of activity nodes, wherein the set of material nodes are buffer nodes that include attributes for a supply of a resource, and wherein the set of activity nodes are no-carry nodes between respective members of the set of material nodes and members of the set of capacity nodes through which supply attributes flow;

receiving an identification of a first demand to be pegged, the identification including attributes that include identification of a material node of the set of material nodes, a unit quantity attribute, and a time bucket attribute for the first demand, wherein the unit quantity attribute is based in part on output of a downstream activity node of the set of activity nodes that shares a downstream edge with the material node, and wherein the time bucket attribute represents a period of consumption of units of the resource by the material node;

in real-time in parallel with a set of other demand pegging processes, independently process the first demand to be pegged by:

in real-time using parallel processing threads that independently execute demand pegging calculations simultaneously without dependency on sequential processing of other demands, wherein the independently processing includes dynamically managing memory allocation by:

calculating a first demand pegging without storing output of the demand pegging calculations in memory simultaneously, and selectively flushing completed peggings to disk storage based on available memory allocation;

identifying a set of other demands for the material node during a time period defined by the time bucket attribute;

determining a priority level attribute for the first demand based on a priority level attribute for at least one activity node corresponding to the first demand and at least one particular demand in the set of other demands based one a priority level attribute for at least one activity node corresponding to the at least one particular demand;

determining a resource available inventory attribute for the material node for the time period, the resource available inventory attribute determined in part based on output of an upstream activity node of the set of activity nodes that shares an upstream edge with the material node and an upstream capacity node of the set of capacity nodes that shares an upstream edge with the material node and in part based on the set of other demands having a higher priority attribute value than the first demand;

calculating a quantity to be pegged attribute based on the unit quantity attribute;

calculating a quantity to skip attribute based on a sum of demand units corresponding to members of the set of other demands having a lower priority attribute value than the first demand pegged to a quantity of the resource corresponding to the resource available inventory attribute;

identifying a supply set of units of the resource for the time period;

generating a pegged subset of the supply set of units of the resource by skipping members of the supply set of units equal to the quantity to skip attribute, wherein a number of members in the pegged subset is equal to the quantity to be pegged attribute; and storing a respective quantity to be pegged attribute at each material node associated with the pegged subset;

automatically calculating an alternative inventory path for the supply based on the supply set of units, wherein the alternative inventory path defines a secondary supply of the units to be directed to the material node;

displaying an interactive pegging visualization graphical user interface including a graphical representation of the supply set of units and the secondary supply of the units, wherein the graphical representation is dynamically updated.

16. The method of claim 15, further comprising:

outputting, for display in a supply chain management application graphical user interface, a graphical representation of the supply set of units for the time period including identification of members of the pegged subset; and automatically transmitting an electronic order to a supplier computing system for an additional quantity of the units for delivery to the material node based on the supply set of units.

17. The method of claim 15, further comprising assigning a priority to each member of the set of other demands.

18. The method of claim 17, wherein members of the set of other demands corresponding to actual demands are assigned a higher priority than members of the set of other demands corresponding to flow plan demands.

19. The method of claim 18, wherein the members of the set of other demands corresponding to actual demands are assigned a priority based on an actual demand priority corresponding to respective of the actual demands.

20. The method of claim 18, wherein the members of the set of other demands corresponding to flow plan demands are assigned a priority based on an activity priority corresponding to an activity node corresponding with respective of the flow plan demands.

* * * * *